Oct. 9, 1928. 1,686,808
G. GODDU ET AL
FASTENING INSERTING MACHINE
Filed April 23, 1921 12 Sheets-Sheet 1

INVENTORS

Oct. 9, 1928.  1,686,808

G. GODDU ET AL

FASTENING INSERTING MACHINE

Filed April 23, 1921    12 Sheets-Sheet 5

Oct. 9, 1928.　　　　　　　　　　　　　　　　　　　　1,686,808
G. GODDU ET AL
FASTENING INSERTING MACHINE
Filed April 23, 1921　　　12 Sheets-Sheet 6

INVENTORS.
George Goddu
Fred L. McKenzie
By their Attorney
Wilson W. Howard

Oct. 9, 1928.

G. GODDU ET AL 1,686,808

FASTENING INSERTING MACHINE

Filed April 23, 1921      12 Sheets-Sheet 7

INVENTORS

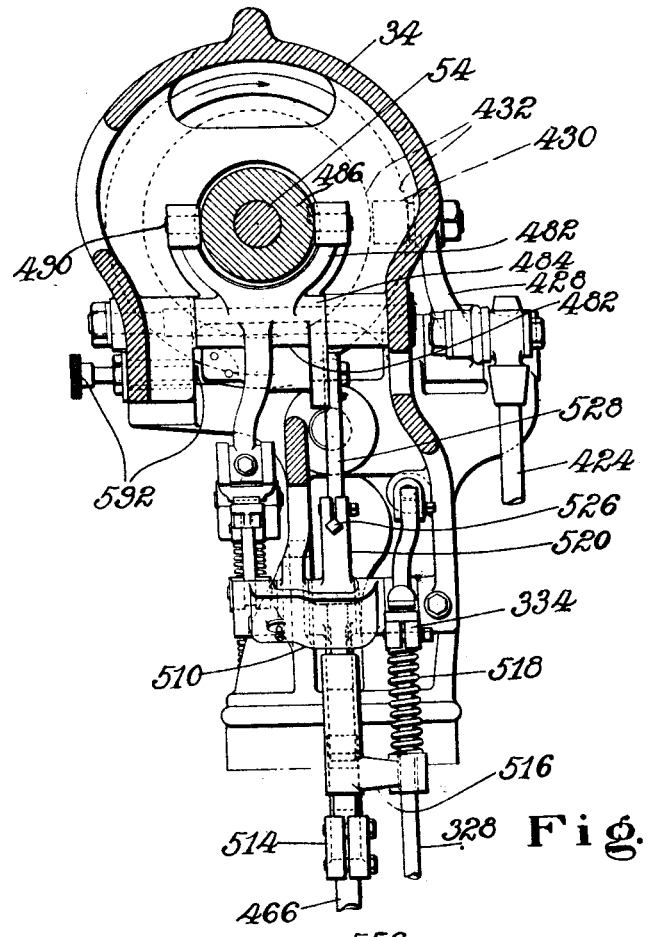
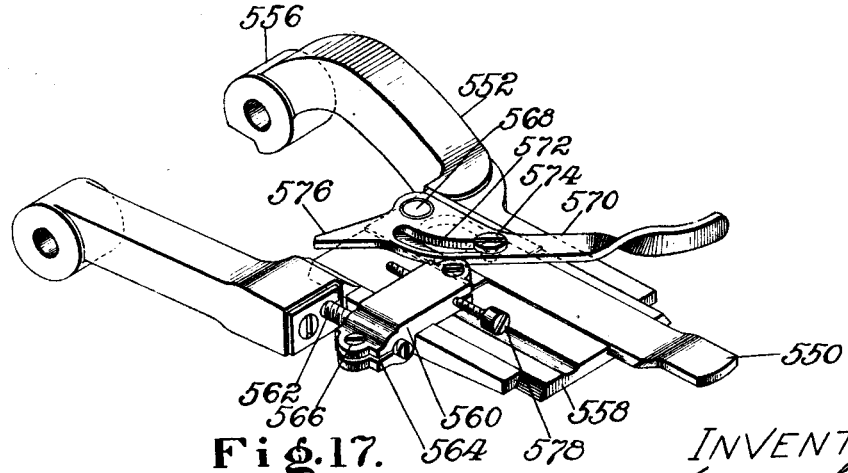

Oct. 9, 1928. 1,686,808
G. GODDU ET AL
FASTENING INSERTING MACHINE
Filed April 23, 1921 12 Sheets-Sheet 10

INVENTORS

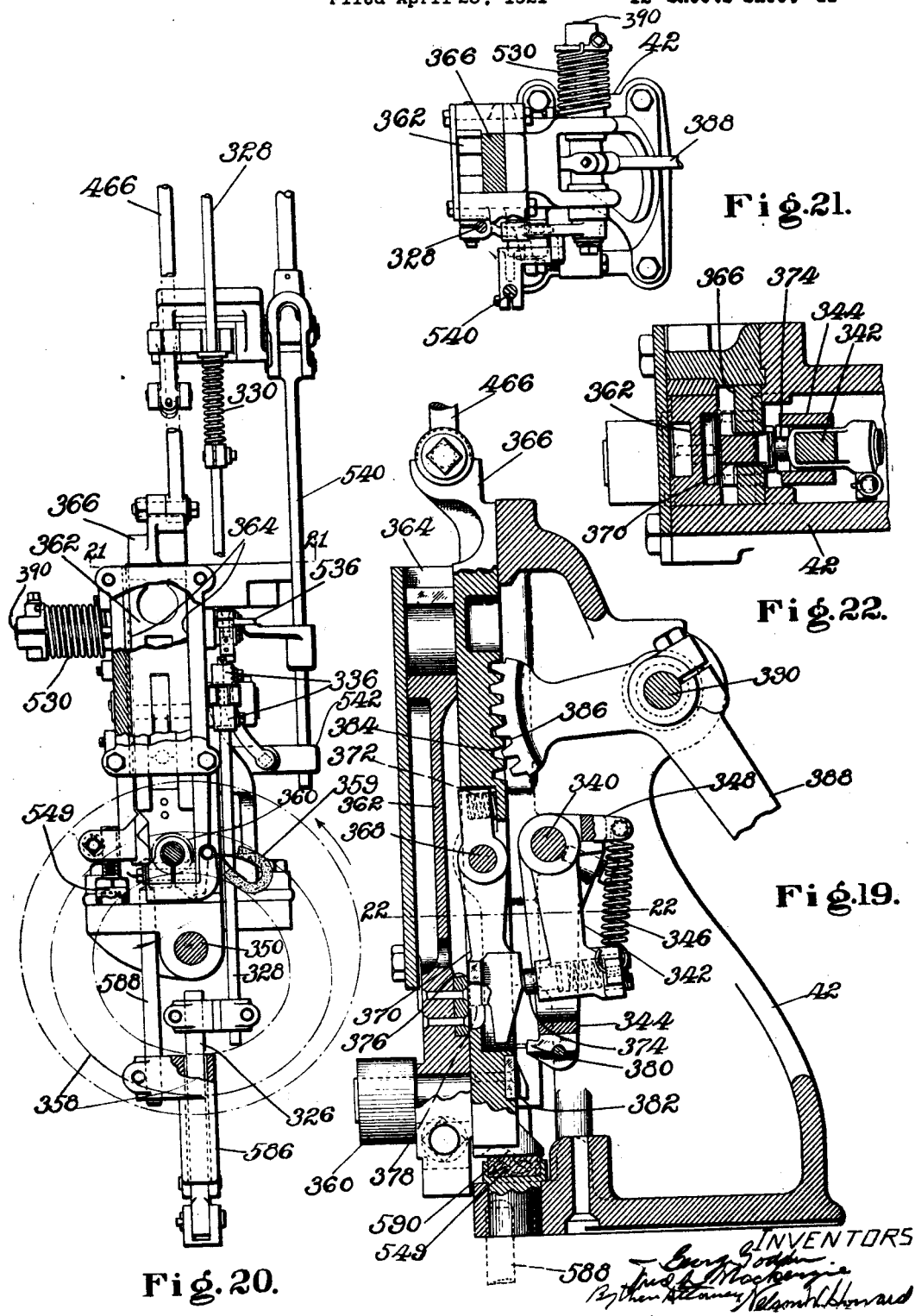

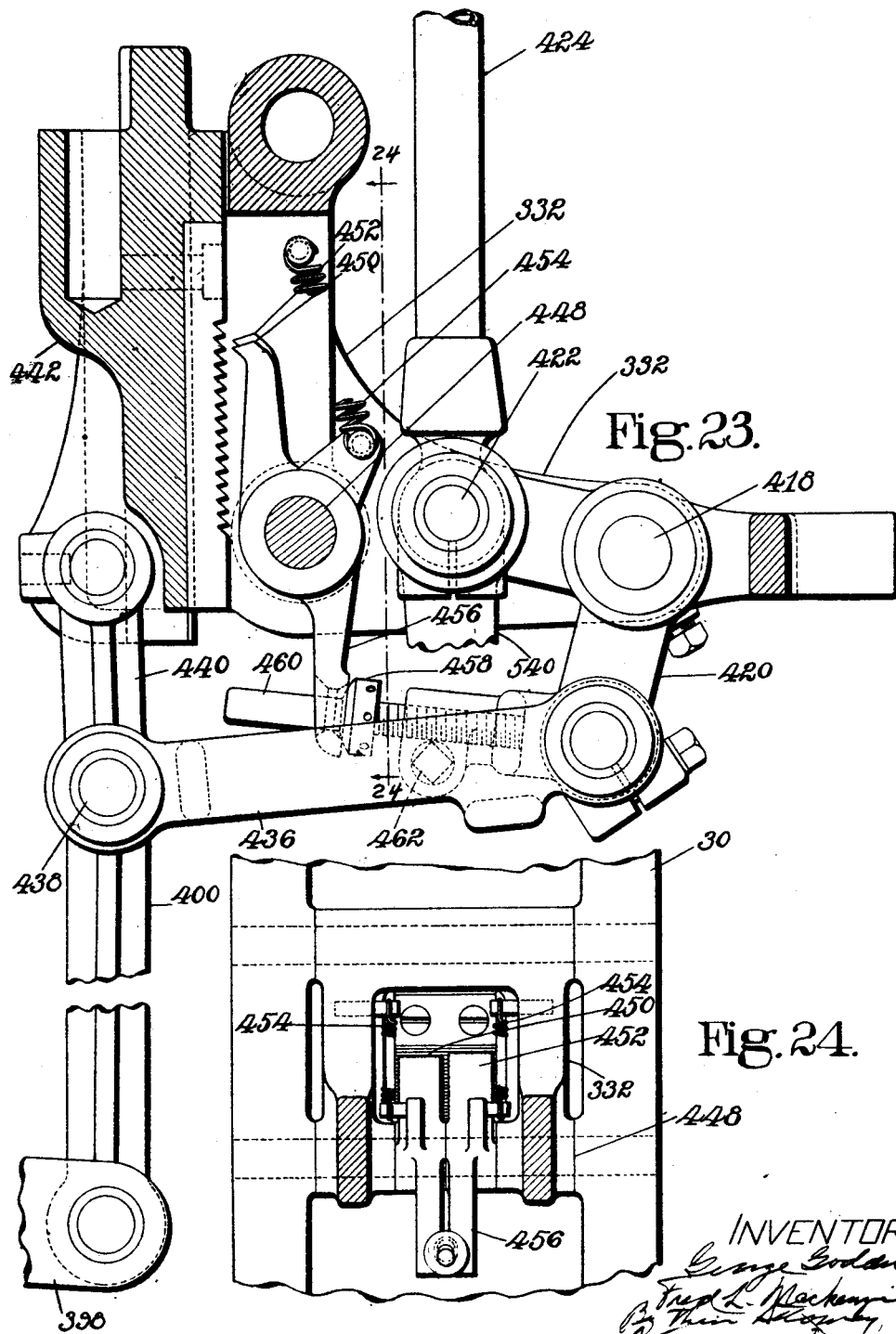

Patented Oct. 9, 1928.

1,686,808

UNITED STATES PATENT OFFICE.

GEORGE GODDU, OF WINCHESTER, AND FRED L. MACKENZIE, OF BEVERLY, MASSACHUSETTS, ASSIGNORS TO UNITED SHOE MACHINERY CORPORATION, OF PATERSON, NEW JERSEY, A CORPORATION OF NEW JERSEY.

FASTENING-INSERTING MACHINE.

Application filed April 23, 1921. Serial No. 463,744.

This invention relates to machines for inserting fastenings and is illustrated as embodied in a machine for inserting slugs such are commonly used in the manufacture of boots and shoes.

Although directed primarily to machines such as are used in the manufacture of boots and shoes to insert fastenings of various kinds and forms, either for uniting parts of boots or shoes, for purposes of ornamentation or for resisting wear, the invention, nevertheless, is applicable in some of its phases to fastening inserting machines in general, whether such machines deal with previously formed fastenings or make as well as insert their own fastenings and whether said fastenings are headed or headless. For the sake of brevity the term "fastening" is herein used to include slugs used for purposes of ornamentation or for resisting wear as well as such fastenings as are used for uniting different parts of the articles operated upon, the term being intended to include everything of a nature to be inserted by machines of this kind.

In inserting fastenings for some purposes, for instance when inserting slugs in the tread surfaces of heels, it is at times desirable to vary the lengths of the different fastenings inserted in a single piece of work. In addition to their wear resisting and ornamental functions the slugs often serve to assist in holding the top lift to the remainder of the heel. For this purpose it is not necessary that all of the slugs be long enough to penetrate well into the body of the heel, it being generally sufficient if but one out of several slugs is of such length, the remainder passing through the top lift and only part way through the next lift. It is particularly desirable, moreover, that the slugs adjacent to the breast corners of the heel be operative to assist in securing the top lift to the heel.

Accordingly it is an object of the invention to insure that the first and last fastenings inserted during each run of the machine, that is, from the time the machine is started until it is next stopped, or either of them, shall be of a different character from, as for example, longer than, some or all of the intermediate fastenings. For this purpose the illustrated machine is arranged to control the lengths of the different fastenings so as to cause the fastenings inserted during each run of the machine to have such variation in length as will enable the fastenings effectively to assist in securing top lifts to the remainder of the heels to which they are attached with the expenditure of a minimum amount of fastening material, the control of the lengths of the fastenings being irrespective of the number of fastenings inserted and of the thickness of the work. To adapt the illustrated machine to varying conditions, it is provided with counting and measuring mechanism for controlling the lengths of the fastenings operable to cause the insertion of a row of fastenings the end fastenings of which are of greater length than some or all of the intermediate fastenings, the arrangement being such that the intermediate fastenings may be either all of a single length, less than that of the fastenings at the ends of the row, or they may be arranged in groups with a single long fastening of the length of the end fastenings between each group of shorter fastenings. In order that the range of utility of the machine may be as great as possible, the counting and measuring mechanism is so arranged that it may also, if desired, be operated to cause the insertion of fastenings all of a single length.

To insure in a simple manner that the last fastening inserted during each run of the machine (or, more broadly, a fastening definitely related to the end of the run) will be a long one, irrespective of the number of fastenings inserted, a feature of the illustrated machine consists in means arranged to cause the machine to operate through a definite period, for example, and as illustrated herein through a single cycle of operation, after the completion of the cycle of operation upon which the machine is engaged when its controller or treadle is released, in combination with mechanism for controlling the lengths of the fastenings operable to cause the insertion of a long fastening at a period definitely related to the end of a run of the machine, as illustrated during its last cycle of operation. Similarly a feature of the invention comprises novel means operable when the machine comes to rest to cause the measuring device to be left in condition to cause the fastening inserted during the first cycle of operation when the machine is again started to be a long one.

Since it is desired to cause the insertion of a long fastening during the first and last cycles of each run of the machine, and since the length of the fastening inserted during each cycle is determined not later than the commencement on that cycle the illustrated machine is arranged, as hereinbefore set forth, not only to complete the cycle of operation upon which it is engaged when the treadle or other controller is operated to stop the machine but also to operate through a single cycle thereafter. To accomplish this a latch is provided for holding in operative position clutch and work support controlling mechanism controlled by the treadle, the latch being only released for an instant at the commencement of each cycle of operation of the machine and thus preventing the release of the treadle from operating to move said treadle controlled mechanism to stopping position until the conclusion of the cycle of operation on which the machine is engaged when the treadle is released. The movement to stopping position of the treadle controlled mechanism which then takes place is utilized to operate mechanism which causes the throwing out of the clutch and the subsequent lowering of the work support at the conclusion of the next cycle of operation of the machine. It should be recognized, however, that the novel clutch controlling and work support raising mechanism, aside from this latching feature, is not limited in its utility to machines arranged to operate through another cycle after that during which the treadle is released before stopping.

A further feature of the invention consists in novel cutting mechanism for severing fastenings from a strip of fastening material. In the illustrated machine this comprises a pair of cutters arranged for relative movement toward each other to cut into but only partially to sever the wire and thereafter to move simultaneously in the same direction, thus co-operating with a throat member adjacent to the cutters to complete the severing of the fastening by a shearing action. This results in leaving the severed fastenings with a very smoothly cut top surface and, since the throat member may remain stationary during the entire severing operation, permits the use of simple and easy running mechanism to control the severing.

It is a further object of the present invention to provide a fastening inserting machine capable of operating at high speed and with a minimum of fatigue upon the part of the operative, the parts of which shall be easily accessible, as for purposes of inspection, and which shall be simple and convenient to assemble or to take apart.

With these objects in view the illustrated machine is provided with a short throw treadle arranged to control novel power operated mechanism for raising the work support and throwing in the clutch, this mechanism also being arranged to throw out the clutch when the machine is stopped before permitting the lowering of the work support. With the same objects still in view a feature of the invention consists in horn control mechanism arranged to lower the horn during the feeding movement of the work and to hold it raised during the insertion of each fastening so constructed that the parts thereof which are most subject to wear and which, accordingly, need most frequent inspection and renewal (as illustrated, a pair of pawls), are visible without removing them from the machine and such that when it is necessary to remove them for purposes of repair or renewal they may be removed and reassembled quickly and with a minimum of inconvenience.

With the foregoing and other objects and features in view the invention will now be described with reference to the accompanying drawings. While these drawings illustrate a preferred embodiment of the invention it should, nevertheless be distinctly understood that they are submitted herewith primarily for purposes of exemplification and that in many of its aspects the benefits of the invention are not dependent upon the specific embodiment herein shown. It is intended therefore that the scope of the invention shall be considered in no way dependent upon the present specific disclosure but rather that it shall be limited only by the scope of the subjoined claims.

Figure 4:
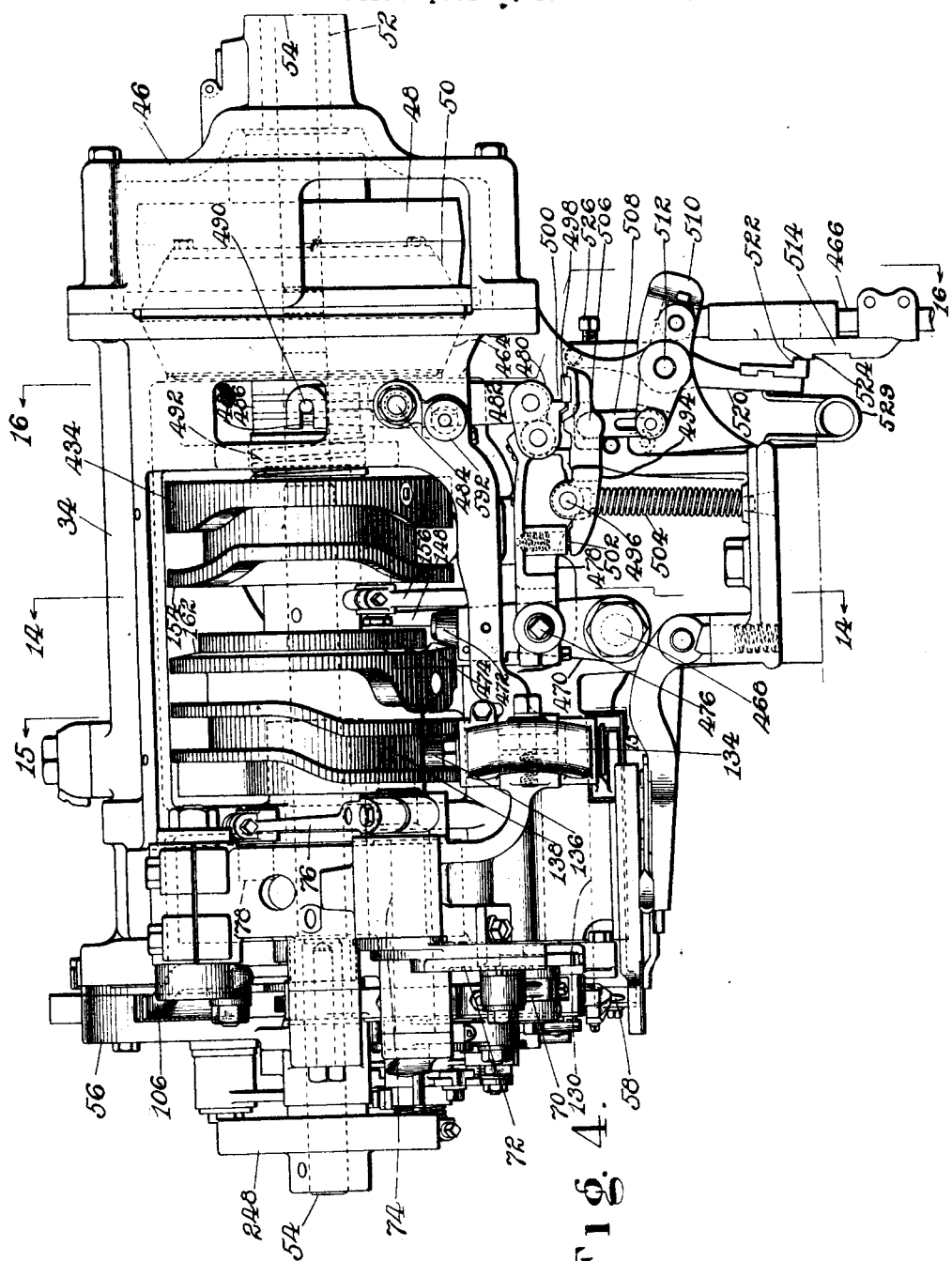
Fig. 4 is a side elevation looking in the opposite direction from Fig. 2, and with a certain cover plate removed.
Figure 15:
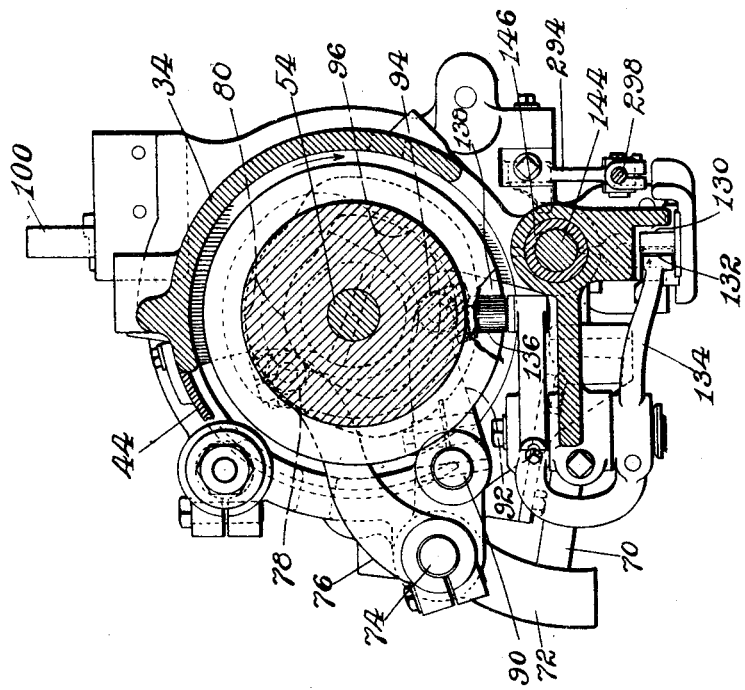
Figure 14:
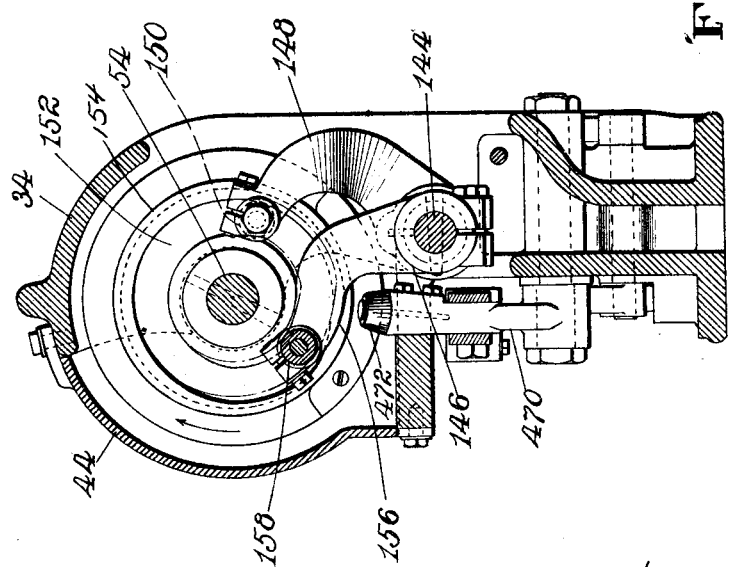
Figure 18:
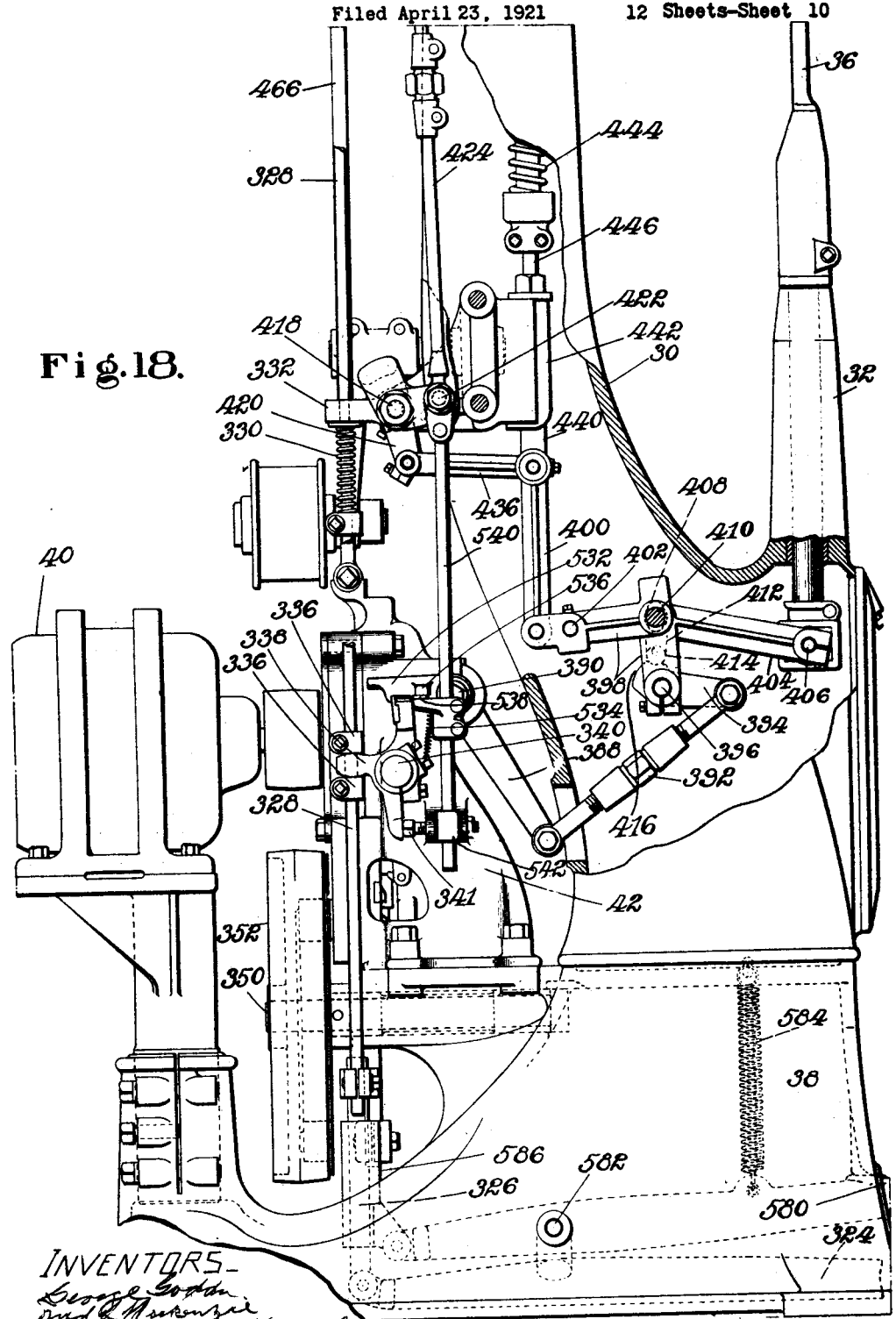

Figs. 14, 15 and 16 are transverse vertical sections on lines 14—14, 15—15, and 16—16, respectively, of Fig. 4;

Fig. 17 illustrates an edge gage which may be used upon the machine;

Fig. 18 shows the base of the machine partly broken away and in section more clearly to show mechanism housed therein, illustrating also a portion of the power-operated work support controlling mechanism;

Fig. 19 is a longitudinal section on a larger scale than Fig. 18 and illustrating mechanism by which a continuously operating live slide is utilized to raise the work support and throw in the clutch of the machine;

Fig. 20 is a transverse section showing the mechanism of Fig. 18 looking from the rear of the machine;

Fig. 21 is a horizontal section on the line 21—21 of Fig. 20;

Fig. 22 is a horizontal section on the line 22—22 of Fig. 19;

Fig. 23 is a vertical section showing a portion of the work support lowering and raising mechanism on a larger scale than in Fig. 18 and Fig. 24 is a section of the pawl and ratchet mechanism of Fig. 23 taken on line 24—24 of that figure on a smaller scale and looking from the rear of the machine.

Figures 1, 2:
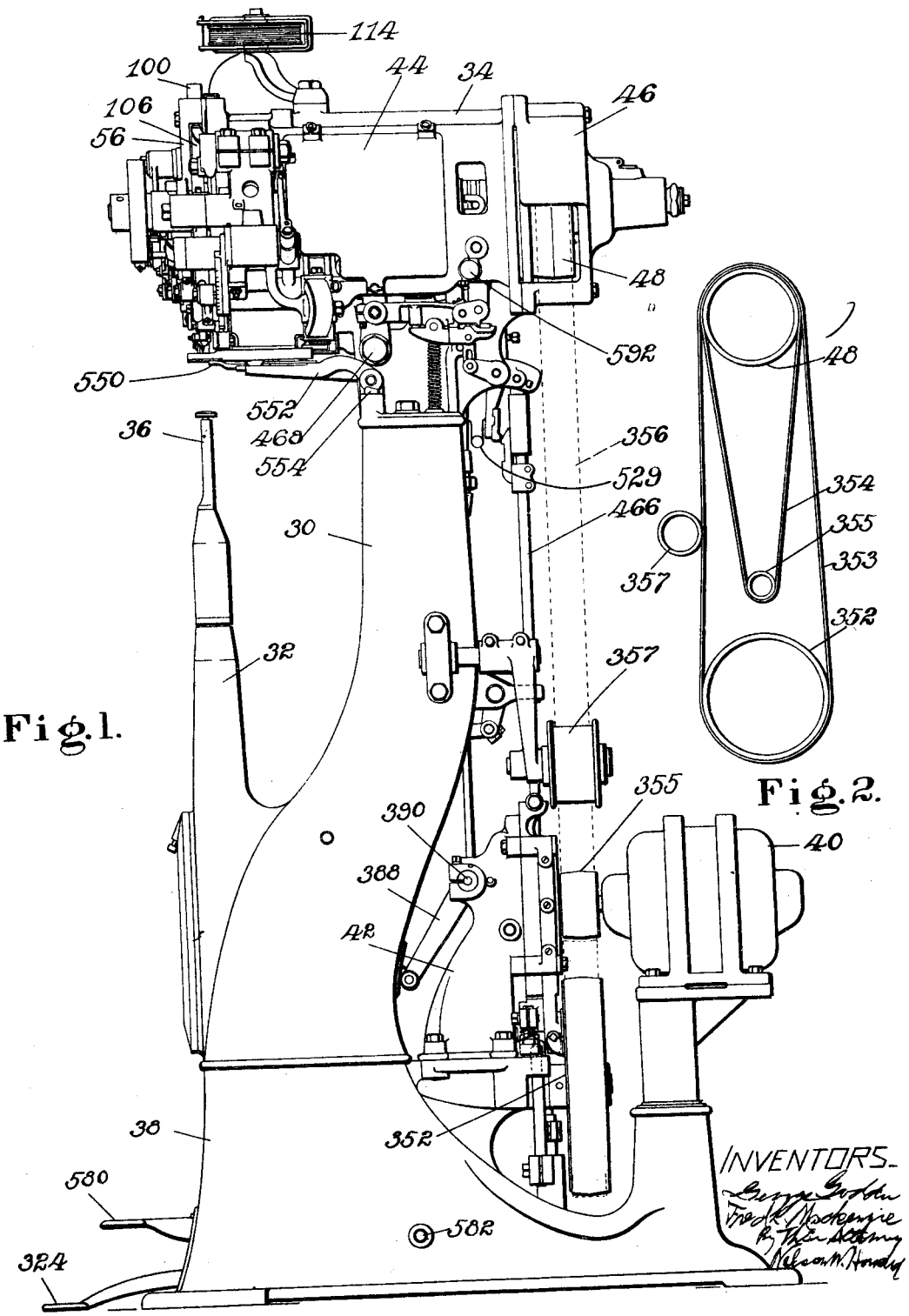
Fig. 1 represents a side elevation of a fastening inserting machine illustrative of a preferred embodiment of the invention.
Fig. 2 is a diagram of an arrangement of belts and pulleys which may conveniently be used to drive the machine.

The illustrated machine is provided as shown in Fig. 1 with a column having a primary standard 30 and a secondary standard 32 carrying the head 34 of the machine and the work support 36 respectively, the latter being arranged to co-operate with a pressure plate or abutment 37 (Fig. 3) carried by head 34 in the usual manner. The column of the machine is carried by a base 38 (Figs. 1 and 18) which may be utilized to carry a motor 40 and which also carries a hollow bracket 42 constituting a housing and support for mechanism hereinafter described.

The head 34 of the illustrated machine is made in the form of a hollow casting secured to the upper end of standard 30 and is provided with a cover plate 44 which may be removed as illustrated in Fig. 4 to give access to the interior of the head. Removably attached to the rear of the head is a casting 46 which serves as a housing for the drive pulley 48 and clutch member 50, as well as being provided with a bearing 52 for the main cam shaft 54. Secured to the front of the head 34 is a casting 56 provided with a bearing for the main cam shaft and serving to support the awl and driver bars as well as a counting and measuring device, feed rolls, and other associated parts.

The illustrated machine is of that type in which an awl, illustrated at 58 (Figs. 4 and 5), is utilized to pierce and feed the work and in which the fastenings are driven by a reciprocating driver shown at 60, both the awl and the driver as well as many other parts of the machine being cam-operated. The machine is arranged to cut fastenings from a fastening strip such as a wire and to drive the fastenings so cut into openings made in the work by the awl. The lengths of the different fastenings are controlled by the counting and measuring device of Figs. 5 to 9, this being effective, as is more fully hereinafter explained, to permit variation within suitable limits of the lengths of the fastenings inserted, and being also operable to cause the fastenings to be inserted in a series of groups, the first fastening of each group being longer than the succeeding fastenings of the group and being followed by a variably predetermined number of shorter fastenings. This mechanism, it is contemplated, will ordinarily be operated as above set forth, and is arranged, moreover, to insure that the first and last fastenings inserted during each run of the machine will be long ones. It is, however, capable of being operated so as to cause only the first and last fastenings inserted during each run of the machine to be longer than the remainder, these latter then being all of the same length. Moreover, if desired, this mechanism may be rendered operative to cause the severing and insertion of fastenings all of a single, though variable, length.

Figures 5, 13:
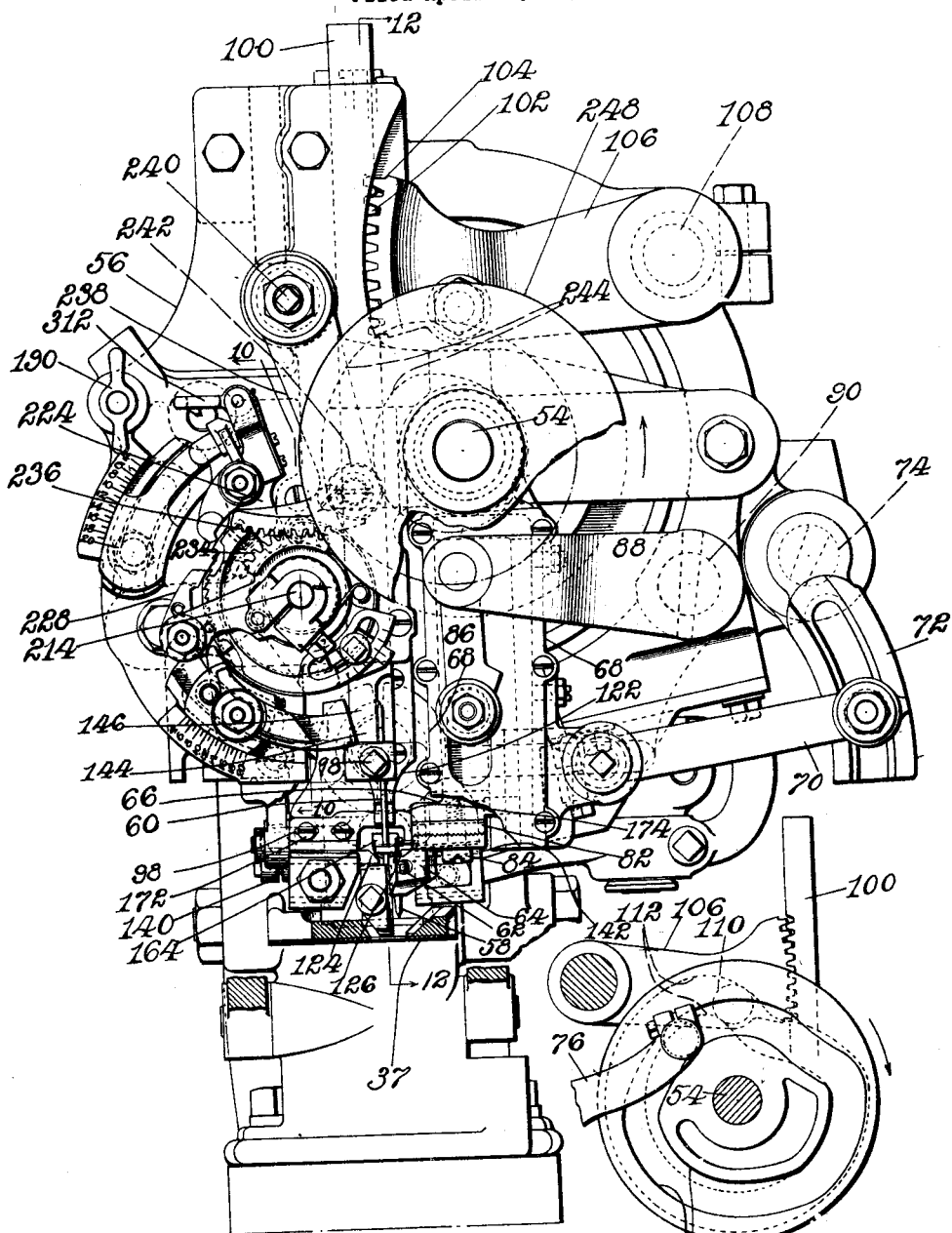
Fig. 5 is a front elevation of the head of the machine with certain parts broken away.
Fig. 13 is a vertical section illustrating the means for reciprocating the driver bar and other associated parts.
Figure 7:
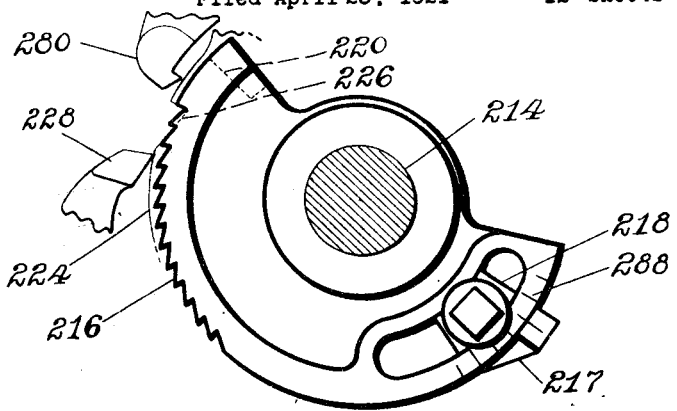
Fig. 7 is a front elevation of a ratchet segment included in the counting and measuring device.

The awl 58 is removably clamped as shown at 62 in an awl holder 64 carried by the lower end of an awl bar 66 mounted for approximately vertical reciprocation in an awl bar carrier 68 supported for oscillation about the main cam shaft 68 is connected by a link 70 to awl bar carrier 72 carried by a rock shaft 74 which is oscillated through an arm 76 (Fig. 15) bearing a cam roll 78 located in a closed cam path 80. The extent of the oscillation of the awl bar carrier 68, and consequently the length of the feeding movement of the awl, may be varied by adjusting the connection of link 70 to arm 72 lengthwise of the latter. In order that the awl 58 may operate to feed the work to the correct position regardless of the extent of the feeding movement, the slot of arm 72 is formed as an arc of a circle having its center at the point of pivotal connection of link 70 to awl bar carrier 68 when the awl is in the position it occupies at the conclusion of each feeding movement, the radius of that circle thus being the effective length of link 70. With this construction adjustment of the connection of link 70 to arm 72 will vary the extent of the feed by varying the position at which the awl enters the work without in any way changing the position which the awl occupies at the conclusion of each feeding movement when it is withdrawn from the work. To provide for adjustment of this latter point, in order to facilitate the setting up of the machine and to permit adjustment to compensate for wear, the awl holder 64 is carried by the awl bar through a connection comprising, as shown in Fig. 5, a plate 82 formed with longitudinal and transverse grooves on its lower and upper faces respectively. These grooves co-operate with corresponding grooves in a plate carried by the awl holder and in the lower end of the awl bar, the parts being held together by a clamp screw 84 passing through suitably arranged slots in the awl holder and in plate 82, and threaded into the lower end of the awl bar.

The reciprocation of the awl bar is accomplished through a link and lever system comprising a link 86 (see Fig. 5) pivotally connected to the awl bar and to an arm 88 carried by a rock shaft 90, the latter, as shown in Fig. 15, being oscillated by an arm 92 provided with a cam roll 94 operating in the closed cam track 96 of a cam carried upon shaft 54. Cam tracks 80 and 96 are so arranged as to cause the awl to enter the work immediately prior to its feeding movement and to be withdrawn from the work at the conclusion of the feeding movement.

In order to permit ready adjustment of the parts in assembling the machine or to compensate for wear, arms 76 and 92 may conveniently be adjustably connected to shafts 74 and 90, respectively, through eccentric bushings. This expedient, in fact, may advantageously be used in many such connections throughout the machine which it is believed to be unnecessary specifically to specify or further to describe.

Figure 12:
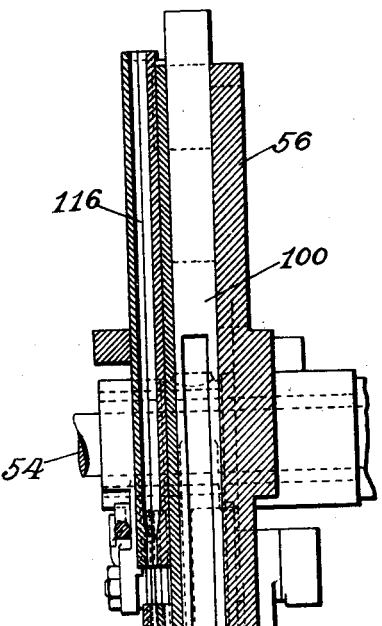
Fig. 12 is a vertical section on the line 12—12 of Fig. 5.

Driver 60, as shown in Figs. 5 and 12, is clamped at 98 to the lower end of a driver bar 100 reciprocating in a vertical way formed in casting 56. Driver bar 100 is provided with a rack 102 meshing with a gear segment 104 formed on the end of an arm 106 carried by rock shaft 108, the latter being journaled in the head of the machine. Arm 106 carries an adjustably mounted cam roll 110 engaging a closed cam track 112 (Fig. 13) formed in the opposite face of the same cam member in which is formed cam track 80.

The fastening strip or wire from which the fastenings are to be severed is supplied to the machine from a reel 114 (Fig. 1) carried by the head of the machine. From the reel the wire passes through wire guide 116 (Figs. 11 and 12) to a pair of feed rolls comprising an idle roll 118 and a driven roll 120. From these rolls the wire is guided through a channel formed in a pair of guide members 122 to the point at which the fastenings are severed therefrom by cutters 124 and 126 (Fig. 5.). From this point the fastenings pass into the receiving opening of throat member 128 which is utilized to transfer the fastenings from the point at which they are severed from the wire to inserting position. For this purpose the throat member is carried by the end of a reciprocating bar 130 slidably mounted for horizontal movement longitudinally of the head of the machine. This bar is provided with a rack meshing with a gear segment 132 caried by an approximately U-shaped arm 134 pivoted to the head of the machine (Figs. 4 and 15) and carrying at its other extremity a cam roll 136 operating in a cam track 138 formed in a cam member mounted upon shaft 54. Thus the throat member 128 is reciprocated in properly timed relation to the operation of the cutters, the driver and the awl.

A pair of cutter holders 140 and 142 (Fig. 5), in which cutters 124 and 126 are adjustably clamped, are provided the former with a shaft 144 and the latter with a sleeve 146 surrounding that shaft by means of which they are pivotally carried by the head of the machine (Figs. 14 and 15). Shaft 144 is arranged for oscillation by an arm 148 carrying a cam roll 150 operating in a cam track 152 formed in the face of a cam member 154 carried by shaft 54. Similarly sleeve 146 is oscilated by an arm 156 carrying a cam roll 158 operating in a cam track formed in a cam member 162 carried by shaft 54 (Figs. 4 and 14).

At the time that the cutter holders and the cutters carried thereby are operated to sever a fastening from the wire the throat is in its rearmost position. The cutters are moved towards one another to an extent which causes them to bite into but only partially to sever the wire. The formation of the cutter operating cams is such that after they have thus partially severed the wire, the two cutters are moved simultaneously in the same direction (toward the right as viewed in Fig. 5) thus co-operating with the top of the throat member to complete the severing of the fastenings by a shearing action, this mode of operation being advantageous in that it leaves the fastenings with relatively smooth tops. As the fastenings are thus severed from the wire the lower end of the wire is given an appreciable movement laterally of the machine. Accordingly it is desirable to provide means for restraining it at the conclusion of the cutting operation and for returning it to its normal position preparatory to the making of the next cut. For this purpose a member 164 (Figs. 5, 11 and 12) is provided with an enlarged opening 166 which the end of the wire enters and with a perforated guide member 168 mounted for floating movement in ways 170 formed therein, this floating guide member being arranged for lateral movement as the cutters move simultaneously in the same direction for the shearing portion of the cut. The opening in member 168 preferably is flared at the top, as shown in Fig. 12. Carried by cutter holder 140, adjustable as by a screw and slot connection 172 (Fig. 5), is a finger 174 having its extremity turned forward and arranged for engagement with floating member 168 to return it to normal position as cutter 124 moves back after each cutting operation. A stop 176 formed upon floating guide member 168 prevents its escape and limits the extent of this movement. The return of the cutter 124 after the conclusion of each cutting operation is so timed with respect to the operation of feed rolls 118 and 120 that floating member 168 will be returned to its normal position just prior to the feeding of the wire for the formation of the next fastening.

Figure 11:
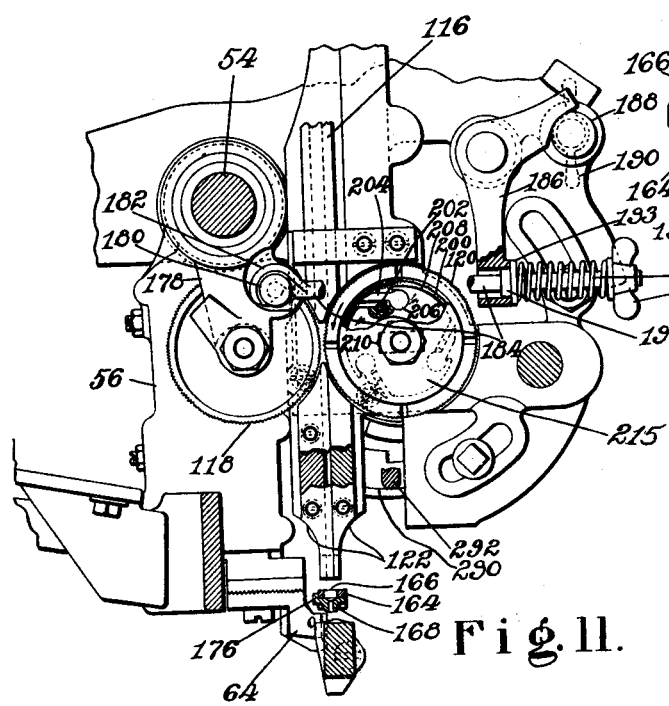
Fig. 11 is a transverse section looking towards the front of the machine and showing the feed rolls and certain associated parts taken substantially on the line 11—11 of Fig. 3.

The idle feed roll 118 is journaled, as shown in Fig. 11, upon the extremity of a lever 178 fulcrumed for adjustment about shaft 54. Carried by lever 178 is a pin 180 engaged by a hook 182 formed upon the end of a rod 184 which passes loosely through an opening near the extremity of the depending arm of a bell crank lever 186 fulcrumed upon casting 56. The other arm of this bell crank lever bears, as shown in Fig. 11, against an eccentric 188 adjustable as by a handle 190 in a bearing in casting 56. Rod 184 is provided with a collar 192 rigidly attached thereto and held by a compression spring 194 in contact with a washer 193 bearing against the depending arm of bell crank lever 186. Threaded upon the extremity of rod 184 and forming the other abutment for spring 194 is a wing nut 196 by means of which the compression of spring 194 and consequently the force with which roll 118 is held against the wire may be adjusted. By rotating eccentric 188 through a suitable angle, bell crank lever 186 may be moved to a position which so releases the pressure of roll 118 against the wire that the wire may be easily inserted or withdrawn from the feed rolls. Moreover, when the pressure is so released, hook 182 may be easily withdrawn from pin 180 as may be convenient in dismantling the machine. In Fig. 11, eccentric 188 is shown in position to cause the release of feed roll 118 to permit the insertion or removal of the wire.

The driven or live feed roll 120, which is formed (Fig. 10) with a sleeve 198 to provide an extended bearing therefor in bushing 199, is formed with an internal ratchet 200. Engaging this ratchet and yieldingly held in contact therewith, as by springs 202, are a series of pawls 204 pivoted at 206 to a pawl carrier 208, the latter being clamped as by a nut 210 to the squared end 212 of a shaft 214 journaled in sleeve 198. As shown, a cover plate 215 houses and protects pawls 204 and ratchet 200. Thus it will be seen that rotation of shaft 214 in the direction of the arrow in Fig. 11, will be operative to give feed roll 120 movement in that direction, the extent of each step of this movement, and consequently the length of wire fed to the cutters, depending upon the extent of the corresponding movement of shaft 214.

Figure 9:
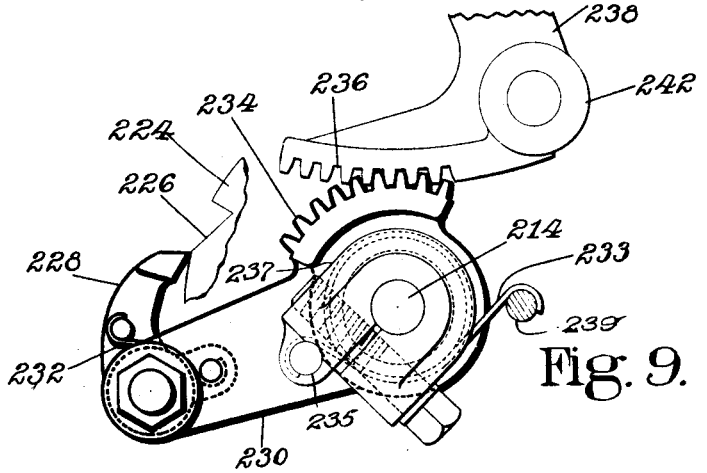
Fig. 9 is a front elevation of a feed pawl and part of its operating means for causing movement of the ratchet segment and feed control lever of Figs. 7 and 8.
Figure 10:
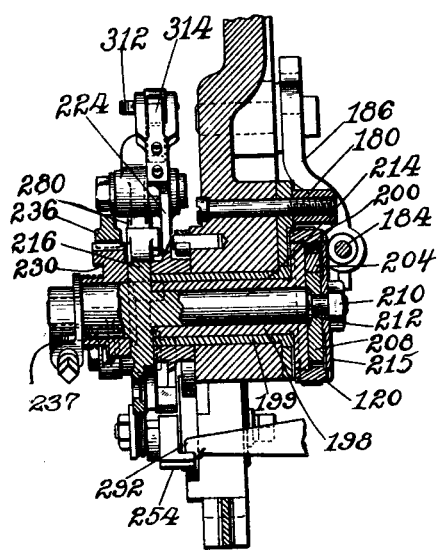
Fig. 10 is a longitudinal section of the counting and measuring device.

In order to vary the lengths of the fastenings in the desired manner, a counting and measuring device illustrated particularly in Figs. 5 to 10, inclusive, is employed. Formed rigid with shaft 214 of the live feed roll 120 is a ratchet segment 216 shown in detail in Fig. 7. This segment is provided with a cam member 217 adjustably carried as by a screw and slot connection 218 for the purpose, as will more fully hereinafter appear, of variably determining the number of short fastenings inserted between consecutive long fastenings. Formed upon the rear of ratchet segment 216 is a shoulder 220 arranged for engagement with a corresponding shoulder 222 (Fig. 6) formed upon a feed control lever 224. This lever 224 is fulcrumed upon bushing 199 and is provided in an arcuate portion of its periphery with a notch 226 having a radial and an inclined surface, which, together with the notches formed by the teeth of the ratchet segment 216, are arranged for engagement with a pawl 228 (Figs. 6 to 9) pivotally carried by an arm 230 journaled upon the extended end of shaft 214, as shown in Figs. 9 and 10. A spring 232 anchored at one end to pawl 228 and at the other to arm 230 tends to hold pawl 228 in contact with feed control lever 224 and causes the pawl to enter notch 226 to engage a tooth of ratchet segment 216 towards the conclusion of each upward oscillation of arm 230. A spring 233, anchored at one end to a pin 235 carried by a collar 237 (Figs. 6, 9 and 10) clamped to shaft 214 and hence rigid with ratchet segment 216 and anchored at the other to a pin 239 carried by casting 56, tends to move ratchet segment 216 in a counter clockwise direction as viewed in Fig. 6. Arm 230 is provided, as shown in Figs. 5 and 9, with a gear segment 234 meshing with a similar segment 236 carried by an arm 238 pivoted at 240 to casting 56. Upon this arm is mounted a cam roll 242 operated by a cam track 244 in cam member 248 mounted upon the forward extremity of shaft 54. By this construction pawl 228 is oscillated periodically through a fixed path over the lower part of which it is held from engagement with the teeth of ratchet segment 216 by the arcuate portion of the periphery of feed control lever 224. When, however, the pawl reaches the notch 226 it passes into engagement with a tooth of the ratchet segment 216 and a little later into engagement with the radial surface forming the terminus of notch 226. Since the ratchet segment 216 is connected through shaft 214 and pawls 204 with the live feed roll, the extent of movement in a clockwise direction as viewed in Figs. 5 and 8 thus imparted to the ratchet segment, determines the extent of the feeding movement of the live feed roll and thus determines the length of each fastening prior to its severing from the wire. To vary the lengths of the different fastenings it is accordingly only necessary appropriately to vary the position of notch 226 and this is done by mechanism now to be described. For this purpose the feed control lever 224 is formed with a shoulder 250 (Fig. 8) which, as the feed control lever is oscillated, is brought, when a short fastening is to be measured, into engagement with a stop 252 formed near the extremity of a lever 254 fulcrumed at 256 to a block 258 adjustably mounted in a way 260 formed in casting 56. A spring 262 bearing at one extremity against lever 254 and anchored at the other to block 258 tends to hold lever 254 in such position that stop 252 lies in the path of movement of shoulder 250 (see Fig. 6) to limit its movement in a counter-clockwise direction, as viewed in Figs. 5, 6 and 8. By adjusting block 258 the position of stop 252 may be varied and, as will subsequently appear, such variation will correspondingly vary the lengths of the short fastenings. A scale such as that indicated at 264 may conveniently be used to indicate the lengths of the fastenings corresponding to different positions of stop 252.

Figure 6:
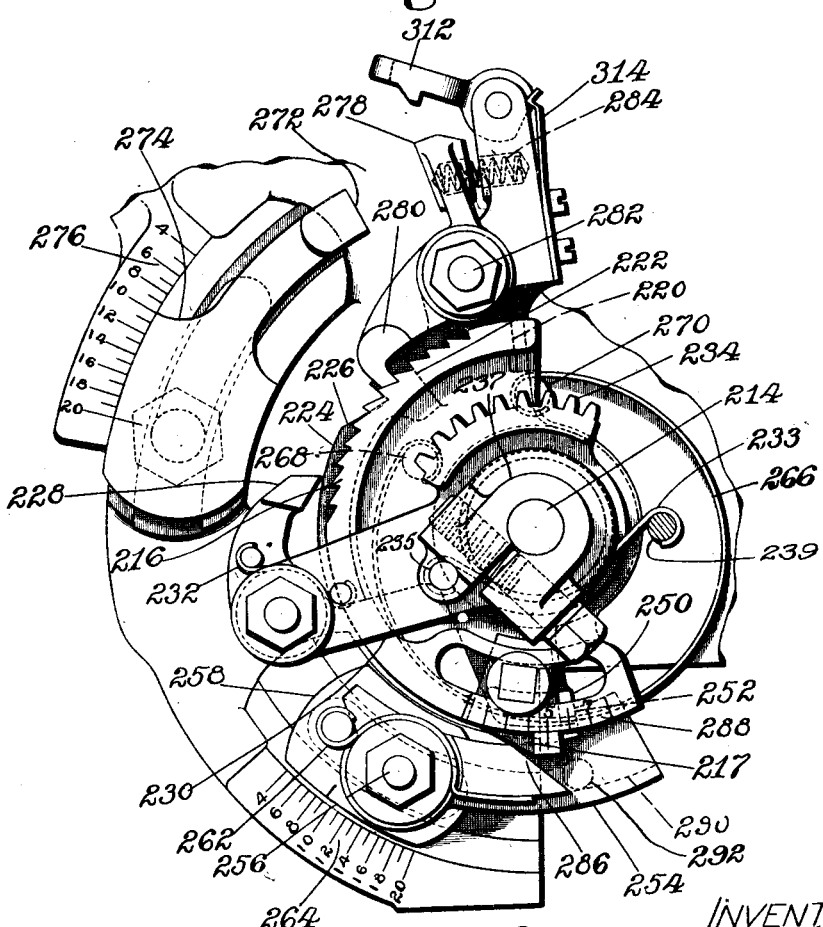
Fig. 6 is a front elevation on a larger scale than Fig. 5 of a counting and measuring device utilized to control the insertion in series in the work of fastenings of variably predetermined lengths.
Figure 8:
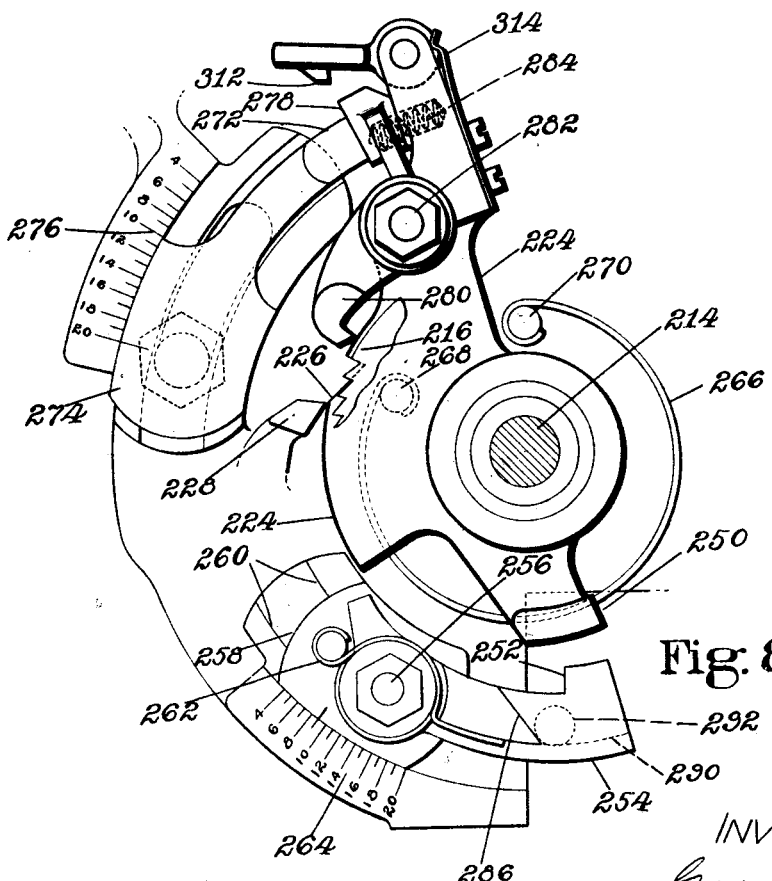
Fig. 8 is a front elevation of a feed control lever and certain other parts associated therewith which control the lengths of the different fastenings.

The length of the long fastenings, which will be formed only when stop 252 has been depressed from the path of movement of shoulder 250 by mechanism hereinafter described, is determined by the position to which the feed control lever 224 is moved by a spring 266, the extremities of which are anchored at 268 and 270, respectively, to the feed control lever 224 and casting 56, when stop 252 is depressed so as to permit shoulder 250 to move therepast. The extent of this movement of feed control lever 224 is determined by the position of a stop 272 carried by a block 274 adjustably mounted in a manner similar to that described in connection with block 268 and conveniently provided with a scale 276 to indicate the length of the long fastenings thus measured. Stop 272 is arranged in the path of movement of a lug 278 formed upon a pawl 280 pivoted at 282 to feed control lever 224 and normally held in position by a spring 284 to engage a tooth of ratchet segment 216. As long as stop 252 remains in the path of movement of shoulder 250, lug 278 is not brought into contact with stop 272 as the feed control lever oscillates and thus pawl 280 remains in engagement with the toothed portion of ratchet segment 216 and prevents its retrograde movement with respect to feed control lever 224. Thus it will be seen that since each oscillation of pawl 228 engages a different tooth of ratchet segment 216, moving that segment a step in a clockwise direction as viewed in Fig. 8 with respect to feed control lever 224, the relative positions of the ratchet segment and the feed control lever which they occupy after pawl 228 has reached the extremity of notch 226, will be retained and after a sufficient number of such movements ratchet segment 216 will have been moved into such position that cam member 217 will be brought into engagement with a corresponding cam surface 286 formed upon lever 254, as shown in Fig. 6. Upon the next oscillation of pawl 228 with the parts in the position shown in that figure, arm 254 will be cammed down from the position which it there occupies to the position in which it is shown in Fig. 8 with the result that upon the retrograde movement of pawl 228, feed control lever 224 will move under the influence of its spring 266 to such an extent as to bring lug 278 of pawl 280 into contact with stop 272, thus lifting pawl 280 out of engagement with ratchet segment 216 and permitting that segment to move under the influence of its spring 233 until its shoulder 220 brings up against shoulder 222 of feed control lever 224. With the parts in this position the next oscillation of pawl 228 will bring that pawl into engagement with a tooth of ratchet segment 216 sooner than is normally the case by a distance equal to the difference in the relative positions which notch 226 of feed control lever 224 occupies according as the latter is stopped by stop 252 or by stop 272, and the forward movement of ratchet segment 216 will be correspondingly greater with the result that the live feed roll 120 will be correspondingly operated to feed a greater than usual length of wire to the cutters, thus forming a long fastening. It may here be observed that the position which pawl 228 occupies at the conclusion of each feeding movement is unvarying and that the variation in the length of the fastenings is accomplished by varying the position at which pawl 228 is let into engagement with the ratchet segment 216. When the feed control lever 224 is permitted, by the withdrawal of stop 252, to move to such a position that lug 278 of pawl 280 is brought into contact with stop 272, the withdrawal of pawl 280 from ratchet segment 216 permits spring 233 to move the ratchet segment to such a position that cam member 217 is moved to a position such as that indicated in Fig. 5, and accordingly short fastenings will thereafter be measured until pawl 228 has made a sufficient number of oscillations to bring cam 217 back into position again to depress lever 254.

The number of short fastenings which it is desired to insert between successive long fastenings may be varied by adjusting cam member 217 with respect to the ratchet segment 216. It will be evident that the further cam member 217 is moved to the right, as viewed in Figs. 5, 6 and 7, the greater will be the number of short fastenings inserted in each series. For the purpose of indicating the number of short fastenings corresponding to the different positions of cam 217 a scale 288 may be provided.

Figure 3:
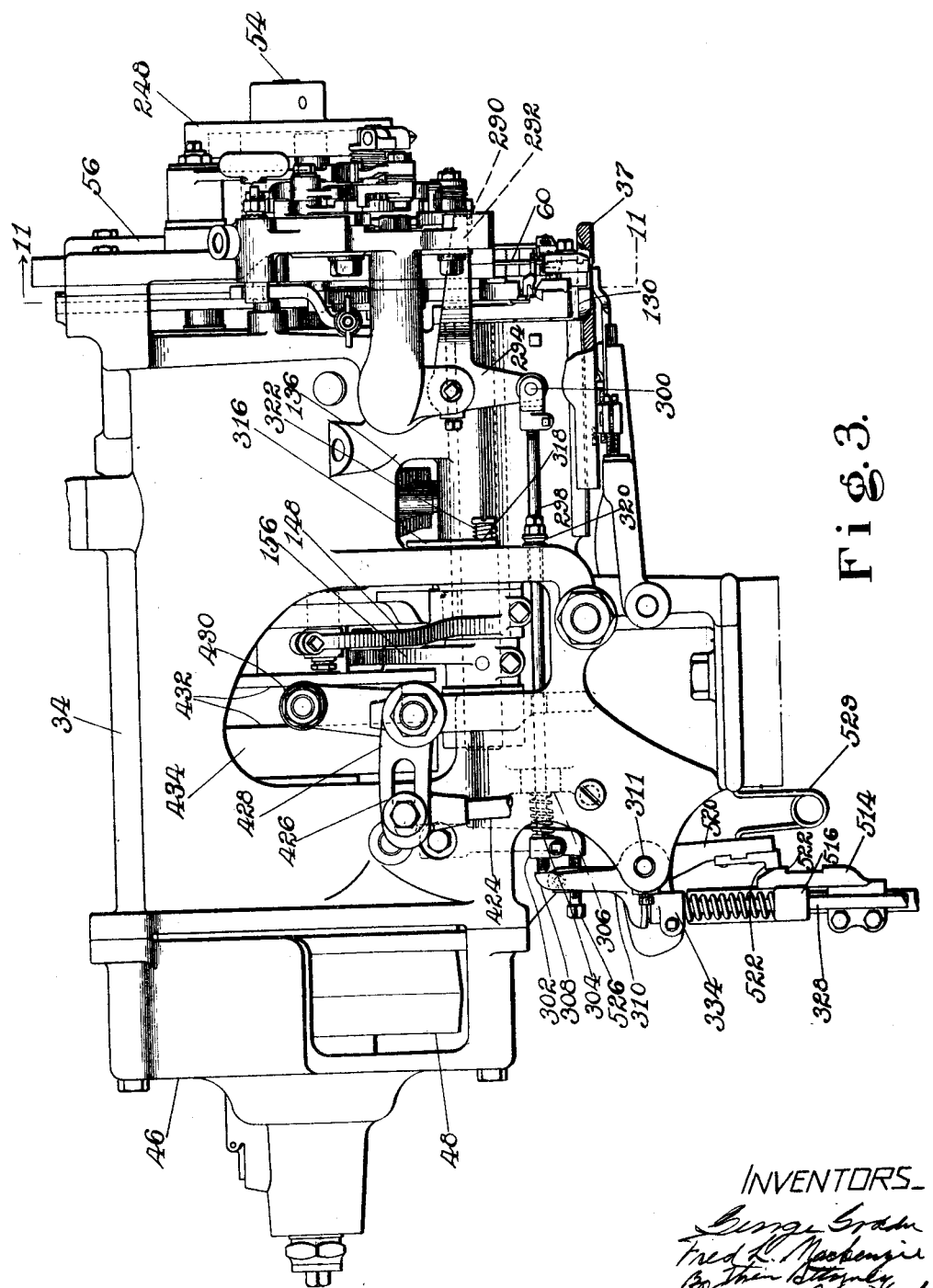
Fig. 3 is a side elevation of the head of the machine.

In order to cause the first and last fastenings inserted during each run of the machine, that is during an uninterrupted series of operations between the starting and stopping of the machine, to be long ones, means is provided for depressing lever 254 prior to the measuring of the last fastening inserted and for holding it depressed until after the measuring of the first fastening to be inserted when the machine is again started. For this purpose a shoulder 290 is formed upon the rear of lever 254, this shoulder being engaged by the extremity 292 of the forwardly extending arm of a bell crank lever 294 fulcrumed on the head of the machine (see Figs. 3, 8 and 11). Bell crank lever 294 is rocked to depress lever 254 prior to the measuring of the last fastening when the machine is stopped by a rod 298 pivoted at 300 to the depending arm of bell crank lever 294 and provided near its rear extremity with an adjustable collar 302 engaged by one end of spring 304, the other end of which bears against a portion of the head of the machine at 306 (Fig. 3). During the operation of the machine the upstanding arm 308 of a bell crank lever 310 pivoted at 311 to the head of the machine is maintained in position to compress spring 304 and thus to hold bell crank lever 294 in such position that the extremity 292 thereof is held free and clear of shoulder 290. Upon the stopping of the machine, however, bell crank lever 310 is permitted to rock in a counter clockwise direction as viewed in Fig. 3 by mechanism hereinafter described to permit spring 304 to move rod 298 rearwardly and thus to cause the extremity 292 of bell crank lever 294 to depress lever 254 just prior to the measuring of the last fastening to be inserted. To cause the first fastening inserted when the machine is again started to be a long one, this condition is not disturbed until immediately after the measuring of the first fastening, but after the first fastening has been measured bell crank lever 310 is rocked in a clockwise direction as viewed in Fig. 3 to cause the extremity 292 of bell crank lever 294 to be lifted from shoulder 290 of lever 254.

If it is desired that all except the first and last fastenings inserted shall be short, as for instance if it is desired that the slugs on the breast corners of a heel be longer than the intermediate fastenings, which latter are all to be of a single length, this may be accomplished by engaging a latch member 312 (Figs. 5, 6 and 8) over lug 278 which is thus permanently retained in the position relative to feed control lever 224 in which it is shown in Fig. 8. To retain latch 312 either in or out of this position its hub is provided with a pair of notches either of which may be engaged by a spring 314 carried by feed control lever 224. When lug 278 is held in the position shown in Fig. 8 by latch 312, pawl 280 will be held permanently out of engagement with latch segment 216. Accordingly upon each retrograde movement of pawl 228 ratchet segment 216 will move in a counter clockwise direction relatively to feed control lever 224 to the position which it occupied prior to its engagement by pawl 228 with shoulder 220 contacting with shoulder 222 so that the count will not be preserved and ratchet segment 216 will never be brought into position to cause interaction of cams 217 and 286 to depress lever 254. Thus the fastenings inserted will all be short, the commencement of each feeding movement of ratchet segment 216 being controlled by stop 252, except that the first and last fastenings inserted will be long since the extremity of lever arm 292 will be depressed in the usual manner to cause the downward movement of lever 254 and its stop 252 when the machine is stopped, thus causing the first and last fastenings to be long ones.

If it is desired that all the fastenings inserted shall be of a single length, this may be accomplished by bringing a latch member 316 pivoted at 318 to the head of the machine (see Fig. 3) down into engagement between a collar 320 adjustably carried by rod 298 and a bearing surface provided upon the head of the machine. A spring 322 is provided to press latch member 316 when in its raised position against a portion of the head of the machine so as frictionally to retain it in that position. When the latch member 316 is lowered to take up its position between collar 320 and the head of the machine it is pinched between those two parts by the action of spring 304 and is securely held in that position. This causes bell crank lever 294 to be rocked in a counter clockwise direction as viewed in Fig. 3 to such an extent that its extremity 292 is permanently out of engagement with shoulder 290 of lever 254 and prevents the rearward movement of rod 298 under the influence of spring 304 when bell crank lever 310 is released for the measuring of the last fastening. Thus it will be seen that if latch 312 is utilized to hold pawl 280 out of engagement with ratchet segment 216 so that the count of short fastenings is not preserved, and if at the same time latch 316 is lowered to prevent the depression of the forward extremity 292 of bell crank lever 294, the fastenings measured will all be of a length corresponding to the position of stop 252 or, as it may conveniently be said, all the fastenings will be short. Of course the length of the fastenings so inserted may be varied by varying the position of stop 252 so that fastenings thus inserted may be of any desired length within certain limits.

As is usual in this type of machine, the work support 36 is arranged to be raised before the clutch is thrown in when the machine is started and to be lowered to work receiving position after the clutch is thrown out when the machine stops, as well as to be lowered a lesser distance to relieve the pressure upon the work during each feeding movement of the awl. For this purpose the machine is provided with power operated horn controlling mechanism arranged to be thrown into operation by displacement of a short throw treadle 324 pivoted to the base of the machine and connected at its rear end to a rod 326 (Figs. 18 and 20) to which is clamped a rod 328 normally forced downwardly by a spring 330 bearing at one end against a collar clamped upon rod 328 and at the other end against a bracket 332 secured to the rear of standard 30. At its upper end rod 328 has clamped thereon a cap 334 (Figs. 3 and 16) arranged when rod 328 is elevated under the influence of treadle 324 to rock bell crank lever 310 against the pressure of spring 304 to raise the extremity 292 of the forwardly extending arm of bell crank lever 294 from shoulder 290 of lever 254. As treadle 324 returns to inoperative position after it is released, cap 334 of rod 328 moves downwardly under the influence of spring 330 and permits bell crank lever 310 to rock so as to move its upper extremity rearwardly permitting spring 304 to rock bell crank lever 294 so as to depress lever 254 as already explained.

Clamped upon rod 328 (Figs. 18 and 20) are a pair of collars 336 receiving between them the rearwardly extending arm of a three-armed lever 338 rigidly but adjustably carried by a shaft 340 journaled in bracket 42 and also rigidly carrying a downwardly extending arm 342 (Fig. 19) housed within bracket 42. An adjustable stop 341 carried by bracket 42 limits the movement of lever 338 in a counter clockwise direction as viewed in Fig. 18 and accordingly limits the downward movement of rod 328 under the influence of its spring 330. Journaled upon shaft 340 and housed within bracket 42 is a lever 344 having a U-shaped depending portion straddling arm 342. A spring 346 anchored at one end to the lower extremity of arm 342 and at the other end to a forwardly extending portion 348 of lever 344 tends to hold part 348 of lever 344 in engagement with a shoulder formed upon the upper portion of arm 342 so that as shaft 340 is rocked in a clockwise direction as viewed in Fig. 19 lever 344 will be yieldingly urged in the same direction, while when shaft 340 is rocked in a counter clockwise direction arm 342 will positively rock lever 344 in that direction.

Journaled in suitable bearings in the base of the machine is a counter shaft 350 (Figs. 18 and 20) carrying a pulley 352 driven by a belt 353 which passes about pulley 48 (Fig. 2.). A belt 354, which connects pulley 48 with a pulley 355 on the rotor shaft of motor 40 passes between pulley 48 and belt 353 and serves to transmit power from the former to the latter. As illustrated in Fig. 1, an idler 357 is adjustably carried by column 30 for the purpose of varying the tension of belt 353 as may be desired. Pulley 352, has formed therein a cam track 358 lubricated by a pad 359 as shown in Fig. 20 and in which is located a cam roll 360 (Fig. 19) mounted upon the lower end of a live slide 362 which, as pulley 354 rotates, is continuously reciprocated in vertical ways 364 carried by bracket 42. Also movable in vertical ways formed in or carried by bracket 42 is a slide 366 to which is pivoted at 368 a latch lever 370 provided with a spring 372 tending to urge it to the position shown in Fig. 19. Bearing against the lower portion of latch lever 370 is a spring pressed plunger 374 housed in the lower portion of arm 342 and provided with a spring of sufficient strength to overcome the effect of spring 372 upon latch lever 370 when shaft 340 and arm 342 carried thereby are rocked in a clockwise direction as viewed in Fig. 19. Carried by the live slide 362 is a hardened plate 376 the upper portion of which is arranged for engagement by shoulder 378 of latch lever 370 when, in the operation of the machine, the latch lever 370 is urged by the rocking of arm 342 against live slide 362 and that slide in its oscillation reaches the lower portion of its path of movement. Under these circumstances the shoulder 378 of latch 370 snaps past the plate 376 and upon the elevation of slide 362 causes also the elevation of slide 366. When this takes place lever 344 is urged by spring 346 in the same direction as arm 342 and a hook 380 formed upon its lower extremity snaps under a shoulder 382 carried by slide 366 as the latter rises so that slide 366 is latched in elevated position. Thus it will be seen that the depression of treadle 324 is operative to cause slide 366 to be raised by power mechanically applied to the machine as by motor 40.

This upward displacement of slide 366 is utilized to raise the work support to operative position as well as to throw in the clutch to start the machine. Mechanism by which this is accomplished will now be described. Formed upon the forward surface of slide 366 is a rack 384 with which meshes a gear segment 386 formed upon the rearwardly extending arm of a bell crank lever 388 fulcrumed at 390 to bracket 42. The forwardly and downwardly extending arm of bell crank lever 388 is connected by an adjustable link 392 to a lever 394 fulcrumed at 396 to the downwardly extending portion of a bifurcated bell crank lever 398, this latter being fulcrumed to the lower extremity of a toggle member 400. Fulcrumed at 402 upon the bell crank lever 398 and lying between the two crank lever arms thereof is a forwardly extending lever 404, the forward end of which supports the work support 36 as shown at 406 (Fig. 18). Lever 404 is provided with a slot indicated in dotted lines at 408 through which passes a pin 410 carried by the column of the machine and itself carrying bell crank lever 398 and depending from lever 404 is an arm 412 carrying a cam roll 414 arranged for engagement with the cam 416 carried by lever 394. Thus when slide 366 is raised cam 416 will be rocked in a clockwise direction as viewed in Fig. 18, the first effect of which will be to rock the forwardly extending end of lever 404 upwardly about its fulcrum 402 so as to raise the work support 36 until the work supported thereby is brought into engagement with the presser plate of the machine. Thereafter lever 404 will rock about 406 as a fulcrum, lifting its rear extremity and thus lifting the rear end of bell crank lever 398 and toggle member 400 connected thereto.

Fulcrumed at 418 to bracket 332 is a bell crank lever 420 the forwardly extending arm of which is pivoted at 422 (Figs. 18 and 23) to a rod 424 the upper end of which, as shown in Fig. 3, is adjustably connected as by a screw and slot connection 426 to the rearwardly extending arm of a bell crank lever 428. The other end of this bell crank lever carries a cam roll 430 operating in a closed cam track 432 (Fig. 3) formed in a cam member 434 carried by shaft 54.

The depending arm of bell crank lever 420 is connected to a link 436 which at its other end is connected at 438 to the upper end of toggle member 400 and to the lower end of toggle member 440 which co-operates therewith. At its upper extremity toggle member 440 is pivoted to the lower end of a ratchet slide 442 mounted for vertical sliding movement in ways formed in standard 30. A stiff spring 444 (Fig. 18) bearing at its upper end against an abutment formed on or carried by standard 30 is operatively connected as indicated at 446 (Fig. 18) to slide 442 so as to tend strongly to depress the slide. Pivoted at 448 to bracket 332 is a pair of pawls 450, 452, each provided with a spring 454 anchored to bracket 332 and tending to throw its pawl into engagement with the ratchet of slide 442. Each pawl has a depending tail 456 arranged for engagement with a nut 458 adjustably threaded upon a rod 460 clamped as shown at 462 to link 436. It will thus be seen that, during the operation of the machine, bell crank lever 420 is oscillated under the control of cam 432, pawls 450, 452 will be moved into and out of engagement with the ratchet of slide 442. In the illustrated machine a pair of pawls are provided one longer than the other by a distance approximately equal to half the distance between adjacent teeth of the ratchet so as to give the effect of a fine toothed ratchet slide while actually using comparatively coarse and rugged teeth. During the operation of the machine toggle 400, 440 is in straightened condition and pawls 450, 452 are withdrawn from ratchet slide 442 at the time each fastening is inserted so that spring 444 serves as a firm though yielding abutment against which the force of the driver is ultimately expended. Immediately after the insertion of the fastening bell crank lever 420 is rocked to throw pawls 450 and 452 into position to engage the ratchet of slide 442. This locks the slide in position and permits the breaking of the toggle to cause the lowering of the work support. At the completion of the straightening of the toggle to raise the work support preparatory to the insertion of the next fastening, pawls 450, 452 are withdrawn by the action of nut 458 upon their tails from engagement with the ratchet of slide 442 so that spring 444 again becomes operative to hold the work support in fastening inserting position. It will thus be seen that the movement of the work support downward for the feeding movement is measured from the position which it occupied at the time of the insertion of the last fastening driven, this downward movement being substantially uniform and unvarying in extent independently of the thickness of the work operated upon. If during a feeding operation the work is moved so that the portion presented for the insertion of a fastening is of a greater thickness than that previously operated upon, the work support 36 will occupy a lower position during the insertion of that fastening and will be moved downward this uniform and unvarying distance from that position.

As is clearly shown in Fig. 24, bracket 332 is formed with a large opening therein so that the movement of pawls 450, 452 may be clearly observed while the machine is in operation and their condition as well as that of the ratchet of slide 442 may be inspected at any time through the open rear portion of standard 30 without dismantling the machine. This is a substantial advantage which this mechanism possesses over other devices previously used for this purpose. Its construction is such, moreover, that when it becomes necessary to dismantle this portion of the machine for the purpose of repairs or otherwise, or to assemble it either in putting together a new machine or while making repairs, such dismantling or assembling can be done much more conveniently and in much less time than is the case with other known mechanisms of this character.

As already stated upward movement of slide 366 is utilized to move clutch member 50 into driving relation to pulley 48. Similarly downward movement of that slide moves clutch member 50 out of driving relation to pulley 48 and into engagement with a brake surface formed or carried at 464 by the head 34 of the machine. For this purpose slide 366 is connected through a rod 466 with clutch controlling mechanism which will now be described.

Fulcrumed at 468 (Fig. 4) to the head of the machine is a lever 470 carrying at its upper end a cam roll 472 positioned to be moved into or out of co-operative relation to a cam surface 474 formed upon cam member 162, according as the machine is to be stopped or started. Pivoted at 476 to lever 470 is a toggle member 478, the other member 480 of the toggle being pivoted to the depending arm of a clutch controlling lever 482 fulcrumed at 484 on the head of the machine. The upper end of lever 482 is bifurcated to straddle the hub 486 of clutch member 50 (Fig. 16) and is provided with a pair of forwardly opening slots 488 arranged to engage corresponding pins 490 formed upon hub 486. A powerful spring 492 tends to throw clutch member 50 into driving relation to pulley 48 but is compressed by the rocking of lever 482 in a counter clockwise direction as viewed in Fig. 4 when the machine is to be stopped.

To facilitate the breaking of toggle 478, 480 when it is desired to stop the machine, the pivotal connection of those members when in their straightened condition is located slightly below the straight line joining the points at which they are respectively pivoted to levers 470 and 482. To hold the straightened toggle in this position a lever 494 is fulcrumed at 496 to toggle member 478, lever 494 being provided with a block 498 arranged for engagement when the toggle is straightened with a latch member 500 formed upon toggle member 480. A spring pressed plunger 502 engages a forward extension of lever 494 so as to hold that lever in position to maintain the toggle in straightened condition when it has been so moved. Pivotally connected at 496 to lever 494 and toggle member 478 is a rod, the lower end of which is located in an opening formed in the bottom of head 34 and in the top of standard 30, and surrounding this rod is coiled a compression spring 504 which exerts a force tending to straighten the toggle.

Pivoted at 506 to lever 494 is a link 508 to which is connected through a pin and slot connection a lever 510 fulcrumed at 512 on the head 34 of the machine. The rearwardly extending arm of lever 510 is connected to rod 466 through a latch member 514 pivoted to the lever and clamped to the rod. Latch member 514 is provided, as shown in Figs. 3 and 16, with a laterally extending arm 516 provided near its extremity with a bore through which passes rod 328. A spring 518 bears at one end against cap 334 and at the other against arm 516 and thus tends to depress rod 466. Fulcrumed at 512 to the head 34 of the machine is a lever 520 carrying at its lower extremity a shoulder 522 arranged for co-operation with a shoulder 524 formed upon latch member 514 and carrying at its upper extremity an adjustable stop illustrated as a screw 526, the forward end of which is located in the path of movement of an arm 528 carried by and extending downwardly from the hub of lever 482 as shown in Fig. 16. A spring 529 tends to hold lever 520 in latching position. Thus movement of lever 482 to throw the clutch out of operation will rock lever 520 against the action of spring 529 in a direction to release shoulder 524 from shoulder 522 to permit downward movement of rod 466.

During the normal operation of the machine slide 366 and rod 466 attached thereto are elevated to such an extent that shoulder 524 of latch member 514 is positioned somewhat above shoulder 522 of lever 520. Upon the lowering of slide 366 and rod 466 as the machine stops, shoulder 524 of latch member 514 comes into contact with and is arrested in its downward movement by shoulder 522 of lever 520. However, the downward movement of rod 466 thus permitted is sufficient to permit the straightening of toggle 478, 480 under the influence of spring 504. This moves roll 472 of lever 470 into engagement with cam surface 474 and, when the rise of that cam comes into engagement with the roll, toggle 478, 480, acting as a rigid bar since latch member 500 engages block 498, rocks lever 482 against the action of spring 492 to move clutch member 50 out of engagement with the clutch surface of pulley 48 and into engagement with brake surface 464. This movement of lever 482 operates to rock lever 520 so that shoulder 522 passes out from under shoulder 524 of latch member 514 and permits rod 466 and slide 366 to drop to their lowest inoperative position. This, among other things, permits the lowering of the work support and in order that this will surely take place a spring 530 anchored at one end to shaft 390 and at the other to bracket 42 is employed. It will thus be seen that the work support is lowered immediately after the clutch has been thrown out of operation.

In order to insure that the last fastening inserted when the machine stops is a long one, the machine is arranged to complete the cycle of operation upon which it is engaged when the treadle is released and to operate through a single cycle of operation thereafter, the fastening inserted during this last cycle being a long one. For this purpose a latch member 532 (Fig. 18) is fulcrumed at 390 upon bracket 42 and is provided with a tension spring 534 tending to urge its free extremity in a downward direction. Near its extremity latch member 532 is provided with a downwardly extending tappet arranged in the path of movement of an upwardly extending arm of lever 338 and in such position that lever 338 is held against movement in a counter clockwise direction as viewed in Fig. 18, except upon the release of latch 532. Thus rod 328 and the parts of the machine controlled thereby are unaffected by the release of the treadle, and indeed the treadle itself does not rise when the operative's foot is withdrawn therefrom, until in the operation of the machine latch 532 is raised. This latch is provided with a finger 536 held by spring 534 against a finger 538 clamped near the lower end of a rod 540. Rod 540 is pivoted at its upper end at 422 to bell crank lever 420, its lower end passing through an opening in a lug 542 projecting from bracket 42. Cam track 432 is provided with a slight depression arranged to rock bell crank lever 428 and thus to elevate rod 540 and finger 538 at the commencement of each cycle of operation of the machine so as to lift latch 532 and almost immediately to return it into position to restrain lever 338. Thus at the commencement of the next cycle of operation after the operative has released the treadle, latch 532 will be raised, lever 338 being then free to permit the lowering of rod 328 under the influence of its spring 330 with the consequent withdrawal of hook 380 from shoulder 382 and shoulder 378 from the path of movement of the block 376 so that slide 366 may move downwardly until stopped by the engagement of shoulder 524 of latch member 514 with shoulder 522 of lever 520. This movement of slide 366 and rod 466 is, however, sufficient to straighten toggle 478, 480 so as to stop the machine at the conclusion of that cycle of operation with the consequent lowering of the work support when the clutch is thrown out of operation. To prevent undue shock at the conclusion of the downward movement of slide 366 as the machine is stopped, a buffer 549 (Fig. 19) is located in the path of movement of a portion of the lower end of that slide.

In order to facilitate the insertion of the fastenings in an even row parallel to the edge of the shoe or other article operated upon, the machine may be provided with a gage 550 which, as shown, is carried by a bracket 552 (Figs. 1 and 17) pivoted to the head 34 and held in operative position by an impositive latch consisting of a spring pressed plunger 554 the end of which engages a notch in hub 556 of bracket 552. Thus, if desired, the gage may readily be turned down out of the way. Slidably mounted in a way provided in the bracket 552 is a plate 558 carrying a lug 560 threaded for engagement with a screw 562 rotatably carried by bracket 552. Rotation of this screw moves plate 558 toward or from the work. To secure this plate in adjusted position lug 560 is split as shown at 564 and is provided with a clamp screw 566 by means of which it may be clamped upon screw 562. Pivoted at 568 to plate 558 is a manually operable lever 570 provided with a cam slot 572 engaging a pin or screw 574 carried by gage member 550 slidably carried in ways formed in plate 558. As shown in Fig. 17, lever 570 is provided with a finger 576 the path of movement of which in one direction may be adjustably limited by a screw 578 carried by lug 560. Hence it will be seen that by oscillation of lever 570 gage member 550 may be moved from one to another of two predetermined positions which may readily be adjusted both with respect to the work and with respect to one another. Thus if it is desired to insert two rows of slugs in the heels of the shoes, gage member 550 may be adjusted so that when extended it positions the heels for the outer row of slugs and when retracted by the oscillation of handle 570 it positions the heels for the insertion of the inner row of slugs.

It may at times be desirable to raise the work support manually either with or without throwing the clutch into operation. For this purpose the machine is provided with an auxiliary treadle 580 fulcrumed at 582 to the base of the machine and normally held in elevated position by spring 584 (Fig. 18). Pivoted to this treadle at its rear extremity is a sleeve 586 to which is clamped a rod 588, the upper extremity of which upon the operation of the treadle enters a depression formed as shown at 590 in the lower portion of slide 366 (Fig. 19). Thus when treadle 580 is depressed slide 366 will be elevated and will raise the work support just as if treadle 324 had been operated. If it is desired to prevent the operation of clutch member 50 so that shaft 54 and the parts operated thereby shall not be operated, when treadle 580 is depressed, this may be accomplished by means of a safety stop 592 (Figs. 4 and 16) consisting of a pin passing through a hole in the head 34 of the machine into the path of movement of lever 482 and restraining that lever from movement under the influence of spring 492 to throw in the clutch. This safety stop has two positions, in either one of which it may be retained, to permit or to prevent the operation of the clutch.

While the mode of operation of the different parts of the machine has been pointed out in the foregoing description, it may be advantageous to recapitulate as follows:

Considering the machine as standing at rest, the operative places the work upon the work support 36 and depresses treadle 324. This operates first to raise the work support by latching slide 366 to live slide 362, the latter being constantly reciprocated by power supplied from the motor. The elevating of slide 366, which is latched in raised position by the engagement of shoulder 382 over hook 380, also results in the breaking of toggle 478, 480 and the consequent movement of clutch member 50 into driving relation with pulley 48 under the influence of spring 492, the upward movement of slide 366 being sufficient to cause shoulder 524 of latch member 514 to take a position somewhat above shoulder 522. The upward movement of rod 328, which takes place as the treadle is depressed, operates through bell crank lever 310, rod 298 and bell crank lever 294 to release the lever 254 of the counting and measuring device so that it may move upwardly into position to measure short fastenings. However, the first fastening inserted will be a long one since its length was determined by the movement of the feed control lever 224 into the position shown in Fig. 8 at the time the machine last stopped. As cam shaft 54 rotates, the throat, which at the time the machine stopped was in its foremost position, moves back and the driver which was slightly below its highest position moves up. The awl then moves to the left to feeding position and downward to pierce the work. At about the same time that the awl starts down the counting and measuring device is operative to feed the wire downwardly into position for the severing of a fastening. Shortly before the awl reaches its lowermost position and during the feeding of the wire, the horn release mechanism is operative to break toggle 400, 440 and immediately after the breaking of that toggle the awl feeds the work forward. While the awl is feeding the work, the wire feed having been completed, the cutters are operated to sever a fastening from the wire and at the conclusion of the feeding movement toggle 400, 440 is straightened to cause the upward movement of the work support and consequent gripping of the work between the horn and abutment 37. After the awl has been withdrawn from the work and before it reaches its highest position it starts to the right, the throat coming forward to bring the severed fastening into alinement with the hole which the awl has made in the work. Shortly before the throat reaches its extreme forward position the driver starts down, entering the throat immediately after the latter has reached its forward position, and inserts a fastening, the driver being immediately moved upward after the fastening is driven. At about the time that the awl starts to withdraw, gear segment 236 commences the retrograde movement of arm 230 with the accompanying measurement of the next fastening by the engagement of shoulder 250 of feed control lever 224 against stop 252. Thus it will be seen that the awl and driver operate alternately to insert a fastening in each cycle of operation of the machine, and that the driving of each fastening is completed in the same cycle in which it is started.

The machine continues to operate in this manner as long as the treadle remains depressed. As the operative nears the conclusion of the desired line of fastenings, he releases the treadle to stop the machine. Since latch 532 restrains movement of lever 338 and consequently prevents downward movement of rod 328 except for an instant at the commencement of each cycle of operation, the releasing of treadle 324 will have no effect upon the operation of the machine until the machine has completed the cycle upon which it was engaged when the treadle was released and commences the next cycle. At this time latch 532 will be lifted, lever 338 then rocking until its depending arm comes in contact with stop 341. This causes the unlatching of slide 366 with the consequent depression of that slide and rod 466 under the influence of spring 518 until shoulder 524 of latch member 514 brings up against shoulder 522 of lever 520, as well as permitting downward movement of rod 328 under the influence of spring 330, with the return of the treadle to its raised position. The downward movement of slide 366 and rod 466 at this time is not sufficient in any way to affect the work support but rocks lever 510 to such an extent as to permit spring 504 to straighten toggle 478, 480, which is latched in straightened position by the engagement of latch 500 against block 498. At the time toggle 478, 480 is straightened the rise of cam 474 has just passed roll 472, the machine having now fairly entered its last cycle of operation. The last cycle of operation continues until the rise of cam 474 operates through roller 472 and the straightened toggle 478, 480 to rock clutch lever 482 against the force of spring 492 to throw clutch member 50 out of operative relation to pulley 48 and to engage with brake surface 464, thus stopping the machine. As lever 482 rocks, its lower end engages screw 526 carried by lever 520, rocking the lower end of that lever to the left as viewed in Fig. 4 and releasing latch member 514. This permits the downward movement of rod 466 and slide 366 to their lowermost position with the consequent lowering of the work support. Latch 316 being in its raised or inoperative position, the downward movement of rod 328 upon the release of latch 532 at the commencement of the last cycle of operation of the machine operates through bell crank lever 294 to depress stop 252 thus insuring that the fastening measured and inserted during the last cycle of operation is a long one and that stop remains in its depressed condition when the machine stops thus insuring that the first fastening measured when the machine is again started on its next run is also a long one.

Having described our invention, what we claim as new and desire to secure by Letters Patent of the United States is:

1. A machine for inserting fastenings having, in combination, means for inserting fastenings of a plurality of different kinds, and automatically operating means for insuring that a fastening definitely related to the end of each of several successive fastening inserting runs of the machine shall be of the same one of said different kinds irrespective of the number of fastenings inserted during the run of the machine and irrespective of the thickness of the work.

2. A machine for inserting fastenings having, in combination, means for inserting fastenings of a plurality of different lengths, and power operated means for determining that a fastening definitely related to the end of a fastening inserting run of the machine shall be of a predetermined length, said length being constant in difficult runs of the machine irrespective of the number of fastenings inserted during the different runs of the machine and irrespective of the thickness of the work.

3. A machine for successively inserting fastenings of a plurality of different lengths having, in combination, fastening inserting means, and means for supplying fastenings of a plurality of different lengths to the fastening inserting means arranged to insure the insertion of a fastening of maximum length in the cycle of operation of the machine following the cycle during which the cessation of insertion of fastenings is initiated and prior to the stopping of the machine.

4. A machine for inserting fastenings having, in combination, means for severing fastenings from a strip, and means operable to insure that the last fastening severed during each run of the machine shall be of greater length than certain of the intermediate fastenings.

5. A machine for inserting fastenings having, in combination, fastening inserting means, and mechanism to control the lengths of the fastenings arranged alternatively to cause the insertion of fastenings all of a single length or automatically to cause the insertion of fastenings the first and last of which are of equal length, with some of the intermediate fastenings or with all of the intermediate fastenings of a different length.

6. In a machine for inserting fastenings, the combination with a source of fastening supply, of means for inserting fastenings, an awl constructed and arranged to penetrate and feed the work once in each cycle of operation of the machine, and automatic means for causing the fastenings to be inserted successively in a series made up of like groups each comprising short and long fastenings, and means to insure that the first fastening inserted is a long one.

7. In a machine for inserting fastenings, the combination with a source of fastening supply, means for inserting fastenings, an awl constructed and arranged to penetrate and feed the work, automatic means for causing the fastenings to be inserted successively in a series made up of like groups each comprising short and long fastenings, and means to insure the insertion of a long fastening during the last cycle of operation of each run of the machine.

8. In a machine for inserting fastenings, fastening inserting mechanism constructed and arranged to insert fastenings of a plurality of lengths in predetermined order, a control member operable to start and stop the machine, and mechanism controlled by the operation of the control member to stop the machine constructed and arranged to control the operation of the fastening inserting mechanism to cause the fastening inserted during the cycle of operation in which the machine comes to rest to be of a predetermined length.

9. In a machine for inserting fastenings, fastening inserting mechanism constructed and arranged to insert in predetermined order long and short fastenings, a treadle arranged by its displacement to start the machine and by its return to normal position to cause the machine to stop, and means operated by the return of the treadle to normal position to insure that the last fastening inserted is a long fastening and to leave the machine in such condition that when it is again started the first fastening inserted will be a long fastening.

10. A machine for inserting successively fastenings of a plurality of different lengths having, in combination, fastening supply means, means for driving the fastenings supplied, and means operable to insure that the last fastening inserted before the cessation of the insertion of fastenings is longer than some or all of the preceding fastenings.

11. In a machine for inserting fastenings, the combination with means for inserting fastenings, of means for controlling the lengths of the fastenings constructed and arranged to cause fastenings of a plurality of lengths to be inserted in succession in a series made up of like groups each composed of fastenings arranged in predetermined order as to length, and means to cause the fastening inserted during the cycle of operation in which the machine comes to rest to be of a length predetermined irrespective of the position of that fastening in one of said groups.

12. A machine for inserting fastenings having, in combination, means for inserting fastenings of a plurality of different kinds, and automatically controlled means to cause the last fastening inserted during a single run of the machine to be of a predetermined kind irrespective of the number of fastenings inserted and irrespective of the characteristics of the work piece.

13. A machine for inserting fastenings having, in combination, means for inserting fastenings of a plurality of different lengths, and means controlled by the stopping of the machine to cause the last fastening inserted during a single run of the machine to be of predetermined length irrespective of the number of fastenings inserted.

14. A machine for inserting fastenings having, in combination, means for inserting fastenings of a plurality of different lengths, and automatically operating means to cause the first and last fastenings inserted during a single run of the machine to be of maximum length irrespective of the number of fastenings inserted.

15. A machine for inserting fastenings having, in combination, means for inserting fastenings of a plurality of different lengths and means operating to insure that the last fastening inserted during a single run of the machine is of maximum length.

16. A machine for inserting fastenings having, in combination, fastening inserting mechanism, and a counting and measuring device operatively connected thereto to control the lengths of the different fastenings inserted constructed and arranged to cause the insertion of a row of fastenings all of a single variably predetermined length or, alternatively, with the end fastenings of the row of equal variably predetermined length and the intermediate fastenings of a different variably predetermined length.

17. A machine for inserting fastenings having, in combination, fastening inserting mechanism, and a counting and measuring device operatively connected thereto and arranged to cause, alternatively, at the will of the operative, the insertion of a series of fastenings all of a single length or a series of fastenings the first and last of which are of equal length and some or all of the intermediate fastenings of lesser length.

18. A machine for inserting fastenings having, in combination, fastening inserting mechanism, counting and measuring mechanism constructed and arranged to cause the fastening inserting mechanism to insert fastenings of variably predetermined lengths in variably predetermined order, means for starting and stopping the machine, and means controlled by the stopping of the machine to cause the fastening inserted during the cycle of operation in which the machine comes to rest to be of maximum length.

19. A machine for inserting fastenings having, in combination, fastening inserting means, and means to control the lengths of the fastenings constructed and arranged to insert fastenings all of a single variably predetermined length or alternatively automatically to insert fastenings the first and last of which are of equal variably predetermined length and the intermediate fastenings of a different variably predetermined length or of a plurality of variably predetermined lengths.

20. A machine for inserting fastenings having, in combination, fastening inserting means, and means to control the length of the fastenings automatically operative to cause the first and last fastenings inserted to be of greater length than some or all of the intermediate fastenings irrespective of the number of fastenings inserted.

21. A machine for inserting fastenings having, in combination, fastening severing means, and means to control the length of the fastenings severed automatically operative to cause the first and last fastenings severed during a single run of the machine to be of greater length than some or all of the intermediate fastenings irrespective of the number of fastenings inserted.

22. A machine of the class described having, in combination, means for inserting a row of fastenings of a plurality of different lengths, and means automatically operative to cause the fastenings inserted at the two ends of the row to be of the same predetermined length irrespective of the number of fastenings inserted.

23. A machine of the class described having, in combination, means for inserting a row of fastenings made up of groups each comprising a long and a predetermined number of short fastenings arranged in predetermined order, and means for insuring that the fastenings inserted at the two ends of the row are long ones.

24. A machine of the class described having, in combination, cutters for severing long and short fastenings in predetermined order from a supply of fastening material, means to insert the fastenings in a row in the work, and means to insure that the fastenings severed for insertion at the two ends of the row are long ones.

25. A machine of the class described having, in combination, means for inserting in a row fastenings of a plurality of different kinds, and means arranged to insure that the fastenings inserted at the two ends of the row are of a predetermined kind.

26. A machine of the class described having, in combination, a cutter arranged to sever fastenings of a plurality of different lengths from a fastening strip, driving instrumentalities arranged to insert the fastenings in a row in the work, and means arranged to insure that the fastenings severed for insertion at the two ends of the row are of predetermined length.

27. A machine of the class described having, in combination, cutters for severing from a strip of fastening material a series of fastenings of a plurality of different lengths, and means to insert the fastenings in a row arranged to insure that both end fastenings are of a predetermined length.

28. A machine of the class described having, in combination, cutters for severing from a strip of fastening material a series of fastenings made up of groups each comprising a long and a predetermined number of short fastenings arranged in predetermined order, and means for inserting the fastenings in a row arranged to insure that long fastenings are inserted at both ends of the row.

29. A machine of the class described having, in combination, cutters arranged to sever long and short fastenings in predetermined order from a strip of fastening material, a feed roll arranged to feed the strip to the cutters, means to insert the fastenings in a row in the work, and means to control the operation of the feed roll to insure that the fastenings inserted at the two ends of the row are long ones.

30. A machine of the class described having, in combination, means for severing fastenings of a plurality of different lengths from a source of fastening material, a throat member arranged to receive the fastenings and transfer them to fastening inserting position, driving instrumentalities arranged for co-operation with the throat to insert fastenings in a row in the work, and means to insure that the fastenings inserted at the ends of the row are of predetermined length.

31. A machine of the class described having, in combination, means for severing fastenings from a single strip of fastening material, a feed roll arranged to feed the fastening material to the severing means, a throat member arranged to receive the fastenings and transfer them to fastening inserting position, driving instrumentalities arranged for co-operation with the throat to insert fastenings in a row in the work, and automatically controlled means for rotating the feed roll intermittently arranged to cause said roll to feed variably predetermined lengths of fastening material to the severing means to cause the severing of successive fastenings of varying and variably predetermined length irrespective of variations in the thickness of the stock in which the fastenings are inserted.

32. A machine for inserting fastenings having, in combination, a feed member arranged to feed a strip of material towards fastening inserting position, means operating in timed relation to the strip feeding member to sever fastenings from the strip, and mechanism for controlling the operation of the strip feeding member to cause the strip feeding member to feed the strip step by step to the severing means with the different steps of a plurality of different lengths and arranged in predetermined order in a series of groups, said mechanism being constructed and arranged to insure that the first step after the machine is started and the last step before the machine stops shall be of maximum length so that the first and last fastenings of those inserted during a single run of the machine will be of maximum length.

33. A machine for inserting fastenings having, in combination, means for severing fastenings from a strip, and means constructed and arranged to insure that the first and the last fastening severed during a single run of the machine shall be of greater length than some or all of the intermediate fastenings.

34. A machine for inserting fastenings of a plurality of different lengths having, in combination, means for severing fastenings from a strip, means for feeding the strip to the severing means, and mechanism constructed and arranged to insure that the last fastening inserted before the stopping of the machine shall be of a greater length than certain of the previously inserted fastenings.

35. A machine of the class described having, in combination, means to sever fastenings from a strip, means to feed the strip to the severing means, and mechanism constructed and arranged to control said feeding means so to feed the strip to the severing means as to form a series of fastenings consisting of a plurality of long fastenings each separated from adjacent long fastenings by a predetermined number of short fastenings and constructed and arranged to insure that the first and the last fastenings of the entire series shall be long fastenings.

36. A machine for inserting fastenings having in combination, an awl, means for moving the awl to cause it repeatedly to pierce, to feed, and then to be withdrawn from the work during each cycle of operation of the machine, means to insert a series of fastenings in the holes formed by the awl in the work, and means to control the length of the fastenings constructed and arranged to insure that the first fastening inserted shall be of greater length than certain of the following fastenings.

37. A machine for inserting fastenings having, in combination, an awl, means for moving the awl to cause it repeatedly to pierce, to feed, and then to be withdrawn from the work, means to insert a series of fastenings in the holes formed by the awl in the work, and means to control the length of the fastenings constructed and arranged to insure that the first and last fastenings inserted shall be of greater length than certain of the intermediate fastenings.

38. A machine for inserting fastenings having, in combination, an awl, means to cause the awl to pierce, to feed, and then to be withdrawn from the work once in each cycle of operation of the machine, means to sever from a wire alternately a long and one or more short fastenings, and means to insert the severed fastenings in the openings formed in the work by the awl constructed and arranged to insert alternately a long and one or more short fastenings.

39. In a machine for inserting fastenings, the combination with means for forming and inserting fastenings, of means for causing fastenings of a plurality of different lengths to be inserted in succession in a series made up of like groups each composed of fastenings arranged in predetermined order as to length, and means to insure that the fastening inserted during the cycle of operation in which the machine comes to rest is of the same length as the first fastening inserted.

40. In a machine for inserting fastenings, the combination with an awl, and means to cause the awl to pierce, to feed, and then to be withdrawn from the work once during each cycle of operation of the machine, of means for causing fastenings of a plurality of lengths to be inserted in the openings formed by the awl in succession in a series made up of like groups each composed of fastenings arranged in predetermined order as to length, said means being adjustable to vary the number of fastenings of one length inserted between successive fastenings of another length.

41. In a machine for inserting fastenings, the combination with means for forming fastenings from a strip of material and inserting said fastenings and a feed roll for feeding said strip of material to fastener forming position, of automatically controlled means for causing fastenings of a plurality of different lengths to be inserted in succession in a series made up of like groups each composed of fastenings arranged in predetermined order as to length.

42. In a machine for inserting fastenings, the combination of an awl arranged to pierce and feed the work, means for inserting fastenings in the opening formed by the awl, means for controlling the length of the fastenings to cause fastenings of a plurality of different lengths to be inserted in succession in a series made up of like groups each composed of fastenings arranged in predetermined order as to length, and means for insuring that a fastening of a predetermined length be inserted during the first cycle of operation when the machine is started.

43. In a machine for inserting fastenings, the combination with means for inserting fastenings, of means for controlling the lengths of the fastenings to cause fastenings of a plurality of different lengths to be inserted in succession in a series made up of like groups each composed of fastenings arranged in predetermined order as to length, and means for insuring the insertion of fastenings of predetermined length during the first cycle of operation when the machine is started and during the last cycle of operation when the machine is stopped.

44. In a machine for inserting fastenings, the combination with an awl arranged to pierce and feed the work and means for inserting fastenings in the openings formed by the awl, of means for controlling the lengths of the fastenings to cause long and short fastenings to be inserted in succession in a series made up of like groups each composed of fastenings arranged in predetermined order as to length, and means for insuring the insertion of a long fastening during the first cycle of operation when the machine is started.

45. In a machine for inserting fastenings, the combination with means for inserting fastenings, of means for controlling the lengths of the fastenings to cause long and short fastenings to be inserted in succession in a series made up of groups each composed of fastenings arranged in predetermined order as to length, and means for insuring the insertion of a long fastening during the cycle of operation in which the machine comes to rest.

46. In a machine for inserting fastenings, the combination with means for inserting fastenings, of means for controlling the lengths of the fastenings to cause long and short fastenings to be inserted in succession in a series made up of like groups each composed of fastenings arranged in predetermined order as to length, and means for insuring the insertion of a long fastening during the first cycle of operation when the machine is started, and during the last cycle of operation when the machine is stopped.

47. A machine for inserting fastenings, having, in combination, fastening inserting means, and means to control the length of the fastenings constructed and arranged to insure that the first and last fastenings inserted are of a greater length than some or all of the preceding fastenings.

48. In a machine for inserting fastenings, the combination with a source of fastening supply, of means for inserting fastenings, an awl constructed and arranged to pierce and feed the work once in each cycle of operation of the machine, and means for causing the fastenings to be inserted successively in the openings formed by the awl arranged to insure that the fastenings are inserted in a series made up of groups each member of which has a predetermined length according to its position in the group with a fastening of a predetermined length at the beginning of the series.

49. In a machine for inserting fastenings, the combination with a source of fastening supply, and a feed roll for feeding the fastening material toward fastening inserting position, of means for inserting fastenings, and automatically controlled means for causing the fastenings to be inserted successively in a series of groups each member of which has a predetermined length according to its position in the group.

50. In a machine for inserting fastenings, the combination with means for inserting fastenings successively, a source of fastening supply, and an awl constructed and arranged to pierce and feed the work, of means for causing the inserting mechanism to insert in succession in the openings formed in the work by the awl fastenings of different lengths in a series made up of groups, said means being arranged to control the insertion of the fastenings so that each group comprises a fastening of one length and one or alternatively, according to the adjustment of said means, a plurality of fastenings of another length.

51. In a machine for inserting fastenings, the combination with means for inserting fastenings, and means for causing the inserting mechanism to insert in succession fastenings of different lengths in a series made up of groups, all the groups except the last comprising a fastening of one length and one or more fastenings of another length and the last fastening of the last group being of a predetermined length independent of the number of fastenings in said last group.

52. In a machine for inserting fastenings, the combination with means for inserting fastenings, and means for causing the inserting mechanism to insert fastenings of different lengths in a series made up of groups, each group except the last comprising a long fastening and one or more short fastenings, and the last fastening of the last group being a long fastening.

53. In a machine for inserting fastenings, the combination with means for inserting fastenings, of means for causing the inserting mechanism to insert fastenings of different lengths in a series made up of groups arranged to insure that the first fastening of each group and the last fastening inserted are of maximum length.

54. In a machine for inserting fastenings, the combination with a source of fastening supply, of means for inserting fastenings, an awl constructed and arranged to pierce and feed the work, and automatic means for causing the fastenings to be inserted successively in the openings formed by the awl in a series made up of like groups each comprising short and long fastenings, and means to insure that the last fastening inserted is a long one.

55. In a machine for inserting fastenings, the combination with a source of fastening supply, of means for inserting fastenings, an awl constructed and arranged to pierce and feed the work, and automatic means for causing the fastenings to be inserted successively in the openings formed by the awl, in a series made up of like groups each comprising short and long fastenings, and means to insure that the first and last fastenings inserted are long ones.

56. In a machine for inserting fastenings, the combination with a source of fastening supply, of means for inserting fastenings, an awl constructed and arranged to pierce and feed the work once during each cycle of operation of the machine, and automatic means for causing the fastenings to be inserted successively in the openings formed by the awl in a series made up of like groups each comprising short and long fastenings, and means to insure the insertion of a long fastening during the first cycle of operation of each run of the machine.

57. In a machine for inserting fastenings, the combination with a source of fastening supply, of means for inserting fastenings, an awl constructed and arranged to pierce and feed the work, automatic means for causing the fastenings to be inserted successively in the openings formed by the awl in a series made up of like groups each comprising short and long fastenings, and means to insure that long fastenings are inserted during the first and last cycles of operation of each run of the machine.

58. In a machine for severing fastenings from a source of fastening supply and inserting the fastenings, the combination of a cutter for severing the fastenings, means independent of the cutter for feeding the fastening material toward fastening inserting position, means for inserting the fastenings, and means arranged automatically to cause the first and last fastenings inserted during each run of the machine to be of a different character from some or all of the intermediate fastenings.

59. In a machine for severing fastenings from a source of fastening supply and inserting the fastenings, the combination of a cutter for severing the fastenings, means independent of the cutter for feeding the fastening material toward fastening inserting position, means for inserting the fastenings, and means for ensuring that the first fastening inserted when the machine is started shall be of a different character from certain of the succeeding fastenings.

60. In a machine for severing fastenings from a source of fastening supply and inserting the fastenings, the combination of a cutter for severing the fastenings, means independent of the cutter for feeding the fastening material toward fastening inserting position, means for inserting the fastenings, and means for causing the fastenings to be inserted successively in a series of groups, each member of which has a predetermined length according to its position in the group, said last named means being adjustable to vary the number of fastenings in a group.

61. In a machine for severing fastenings from a source of fastening supply and inserting the fastenings, the combination of a cutter for severing the fastenings, means independent of the cutter for feeding the fastening material toward fastening inserting position, means for inserting the fastenings, and means for insuring that the first fastening inserted when the machine is started is longer than certain of the succeeding fastenings.

62. In a machine for severing fastenings from a source of fastening supply and inserting the fastenings, the combination of a cutter for severing the fastenings, means independent of the cutter for feeding the fastening material toward fastening inserting position, means for inserting the fastenings, and means for insuring that the first and last fastenings inserted during each run of the machine are longer than some or all of the intermediate fastenings irrespective of the number of fastenings inserted.

63. In a machine for inserting fastenings, the combination with fastening inserting means, and a feed roll, of mechanism for operating the feed roll including means for controlling the lengths of the fastenings to be inserted, and means for causing said controlling means to provide fastenings of varying lengths in predetermined order as to lengths including mechanism controlled by the stopping of the machine to control the length of the last fastening inserted.

64. A machine for inserting fastenings having, in combination, fastening inserting means, automatic means for causing said inserting means to insert in succession fastenings of varying lengths, and means for controlling said last named means to cause a fastening of a definite length to be inserted during the first cycle of operation when the machine is started and to insure that a fastening of the same length is inserted during the last cycle of operation when the machine is stopped.

65. A machine for inserting fastenings having, in combination, fastening inserting means, automatic means for causing said inserting means to insert in succession fastenings of varying lengths, and means for controlling said last named means to insure that the last fastening inserted during the last cycle of operation of a plurality of successive runs of the machine shall be of the same length irrespective of the number of fastenings inserted.

66. A machine for inserting fastenings having, in combination, fastening inserting means, automatic means for causing said inserting means to insert in succession fastenings of varying lengths, and means for controlling said last named means arranged to insure that the last fastening inserted during each of a plurality of successive runs of the machine shall be of the same predetermined length.

67. A machine for inserting fastenings comprising fastening inserting means, automatic means for causing said inserting means to insert in succession fastenings of a plurality of different lengths, and automatic means for insuring that the first fastening inserted when the fastening inserting means is rendered operative and the last fastening inserted when the fastening inserting means is rendered inoperative are of the same predetermined length irrespective of the number of fastenings inserted.

68. A machine for inserting fastenings comprising, fastening inserting means, automatic means for causing said inserting means to insert in the same row both short and long fastenings, and automatic means for insuring that the last fastening inserted during each of several successive runs of the machine is of the same predetermined length irrespective of the number of fastenings inserted.

69. A machine for inserting fastenings comprising fastening inserting means, automatic means for causing said inserting means to insert in the same row both short and long fastenings, and automatic means for causing the last fastening inserted during each run of the machine to be a long fastening.

70. A machine of the class described having, in combination, fastening inserting means and means for controlling the operation of said inserting means constructed and arranged to cause the insertion of fastenings of a plurality of different lengths in predetermined order as to length, said means being adjustable whereby both the order in which the fastenings of different lengths are inserted and the lengths of the different fastenings may be adjustably predetermined, and means to insure that the fastening inserted when the machine is rendered inoperative is a long fastening.

71. A machine of the class described having, in combination, fastening inserting means, and means for controlling the operation of said inserting means constructed and arranged to cause the insertion of fastenings of a plurality of different lengths in predetermined order as to length, said means being adjustable whereby both the order in which the fastenings of different lengths are inserted and the lengths of the different fastenings may be adjustably predetermined, and means to insure that the first fastening inserted when the machine is rendered operative and the last fastening inserted when the machine is rendered inoperative are long fastenings.

72. A machine of the class described having, in combination, fastening inserting means, and means for controlling the operation of said inserting means constructed and arranged to cause the insertion of fastenings of a plurality of different lengths in predetermined order as to length, said means being adjustable without the removal of any part from the machine whereby both the order in which the fastenings of different lengths are inserted and the lengths of the different fastenings may be adjustably predetermined, and means to cause the insertion of a long fastening during the first cycle of operation when the machine is rendered operative.

73. A machine of the class described having, in combination, means for inserting fastenings, means for controlling the operation of said inserting means in such manner that fastenings of a plurality of different lengths may be automatically inserted in predetermined order as to length, and means for controlling the actuation of said controlling means to insert a fastening of predetermined length during the first cycle of operation when the machine is started, at the will of the operative either equal to or longer than succeeding fastenings.

74. A machine of the class described having, in combination, means for inserting fastenings, means for controlling the operation of said inserting means in such manner that fastenings of a plurality of different lengths may be automatically inserted in predetermined order as to length, and means for controlling the actuation of said inserting means to insert a fastening of predetermined length during the first cycle of operation when the machine is started and during the last cycle of operation when the machine is stopped.

75. A machine for inserting fastenings of a plurality of different lengths having, in combination, fastening inserting means, and a controller arranged to cause the machine to operate after the manipulation of the controller to stop the machine until after the insertion of a fastening of a length predetermined uniformly in each of a plurality of successive runs of the machine irrespective of the number of fastenings inserted in each run.

76. A machine for inserting fastenings having, in combination, means for inserting a succession of long and short fastenings, and a controller movable to stop and start the machine constructed and arranged to cause the machine to operate after the manipulation of the controller to stop the machine until after the insertion of a long fastening.

77. A machine for inserting fastenings having, in combination, means for inserting fastenings of a plurality of different kinds, and a controller operative by its movement to start and stop the machine and arranged to cause the machine to operate after its manipulation to stop the machine until after the insertion of a fastening of a predetermined kind.

78. In a machine of the class described, a feed control lever, means for oscillating said lever, a stationary stop and a movable stop located in the path of movement of said lever to limit the movement thereof, and means for periodically withdrawing the movable stop once in several cycles of operation of the machine to permit said lever to move until stopped by the stationary stop.

79. In a machine of the class described, a feed control lever, a feed roll operated thereby, means for oscillating the feed control lever, a stationary stop and a movable stop located in the path of movement of said lever to control the extent of movement thereof, and thus to control the movement of the feed roll, and means for withdrawing the movable stop once in several cycles of operation of the machine to permit the feed control lever to move until stopped by the stationary stop.

80. In a machine of the class described, a feed roll, a feed control lever, a one way drive operatively connecting the feed control lever and the feed roll and arranged to rotate the feed roll a distance dependent upon the extent of angular movement in one direction of the feed control lever, mechanism constructed and arranged to cause oscillating movement of the feed control lever, and means operating while the machine is in operation for varying the extent of the angular movement of said feed control lever independently of the thickness of the work.

81. In a machine of the class described, a feed roll, a feed control lever, a pawl controlled by the feed control lever and arranged to give a step-by-step movement to the feed roll, the length of each step of the movement of the feed roll being dependent upon the length of the corresponding oscillating movement of the feed control lever, means to cause oscillating movement of the feed control lever through a series of oscillations of variably predetermined amplitude, and means for controlling the amplitude of the oscillating movement of the feed control lever in the last cycle of operation when the machine is stopped, independent of the number of oscillations since the machine was started.

82. In a machine of the class described, a feed roll, a movable feed control member, a one way drive for the feed roll arranged to rotate the feed roll a distance dependent upon the extent of movement in one direction of the feed control member, and mechanism constructed and arranged to cause movement of the feed control member through a variably predetermined path, said path being of maximum extent during the last cycle of operation when the machine is stopped.

83. In a machine of the class described, a strip feeding means, a movable feed control member, a one way drive for the feeding means arranged to cause movement of the feeding means depending in extent upon the corresponding movement of the feed control member, and mechanism constructed and arranged to cause movement of the feed control member through a variable path the extent of which, during the last cycle of operation, is determined by the stopping of the machine.

84. A machine for inserting fastenings having, in combination, fastening severing and inserting means and strip feeding means arranged to feed a strip of material to fastening severing position, a movable feed control member, a one way drive for the feeding means arranged to cause movement of the feeding means depending in extent upon the movement of the feed control member, and mechanism constructed and arranged to cause movement of the feed control member through a variably predetermined path, said path being of maximum extent during the first cycle of operation when the machine is started and the last cycle of operation when the machine is stopped.

85. A strip feeding device having, in combination, a feed roll, a feed control lever for the feed roll having an arcuate edge concentric with its fulcrum and with a notch therein, and provided also with a shoulder, a stop removably held in the path of movement of said shoulder, yielding means tending to move the feed control lever about its fulcrum in a direction to cause said shoulder to contact with said stop, and an oscillating pawl arranged to enter the notch in the arcuate edge of the feed control lever to give to said feed control lever oscillations of amplitude dependent upon the position of said stop.

86. In a machine for inserting fastenings, a strip feeding device having, in combination, a feed roll, an oscillatable feed control lever therefor arranged to cause movement of the feed roll depending in extent upon the movement of said feed control lever, a stop removably held in the path of movement of a part of said feed control lever and arranged to limit the movement thereof to control the arc of rotation of said feed roll, and means constructed and arranged periodically to move said stop out of the path of movement of said feed control lever to cause an increased arc of movement of said feed roll.

87. In a machine for inserting fastenings, a strip feeding device having, in combination, a feed roll, an oscillatable feed control lever therefor arranged by the extent of its oscillation to control the arc of movement of the feed roll, a stop removably held in the path of movement of a part of said feed control lever to limit the movement thereof and accordingly to control the arc of movement of the feed roll, and means arranged periodically to remove said stop from the path of movement of the feed control lever to permit an increase movement of the feed control lever and correspondingly to cause an increased movement of the feed roll.

88. In a machine for inserting fastenings, a strip feeding device having, in combination, a feed roll, an oscillatable feed control lever therefor arranged by the amplitude of its oscillation to control the extent of feeding movement of the feed roll, means arranged ordinarily to limit the movement of said feed control lever, and means arranged periodically during the operation of the machine to render inoperative said limiting means to permit greater oscillation of the feed control lever and correspondingly greater movement of the feed roll.

89. In a machine for inserting fastenings, a strip feeding device having, in combination, a feed roll and an oscillatable feed control lever therefor arranged by the amplitude of its oscillation to control the feeding movement of the feed roll, a stop removably held in the path of movement of a portion of said feed control lever, and means operated periodically during the operation of the machine to remove said stop from the path of movement of the feed control lever to cause at such times a feeding movement of the feed roll of greater than ordinary amplitude.

90. In a machine of the class described, the combination of a feed control member, means for reciprocating said member, a stationary stop and a movable stop located in the path of movement of said member and operative alternatively to limit the movement thereof, and means for withdrawing the movable stop once in several cycles of operation of the machine to permit said member to move until stopped by the stationary stop.

91. In a machine of the class described, the combination of a feed roll, a ratchet segment operatively connected thereto, an oscillating pawl, a feed control lever arranged to hold the pawl out of contact with the ratchet segment during a variably predetermined portion of its path of movement and to permit the pawl to have engagement with said ratchet segment during the remainder of its movement, a stop, and means for moving the stop periodically out of the path of movement of a portion of the feed control lever to cause movement of the ratchet segment of greater than ordinary amplitude.

92. In a machine of the class described, the combination of a feed control member, means for moving said member, a pair of stops located in the path of movement of said member and operative alternatively to limit the movement thereof, and means for withdrawing one of the stops once in several cycles of operation of the machine to permit said member to move until stopped by the other stop.

93. In a machine of the class described, the combination of a feed roll, a ratchet segment operatively connected thereto, an oscillating pawl, a feed control lever arranged to hold the pawl out of contact with the ratchet segment during a variably predetermined portion at the commencement of its path of movement and to permit the pawl to have engagement with said ratchet segment during the remainder of its movement, and a stop moved periodically out of and into the path of movement of a portion of the feed control lever to vary the point at which the pawl enters into engagement with the ratchet segment.

94. In a machine of the class described, the combination of a feed control lever, means for oscillating said lever, a pair of stops located in the path of movement of portions of said lever and operative alternatively to limit the movement thereof to a shorter or a longer path, means for periodically withdrawing the stop which limits the movement of the lever to the shorter path to permit the lever to move through the longer path until stopped by the other stop, and means operated by the lever to measure and feed a shorter or a longer fastening according as the lever is oscillated through a shorter or a longer path.

95. In a machine of the class described, the combination of a feed roll, a ratchet segment operatively connected thereto, a pawl oscillating through a fixed path, a feed control lever arranged to hold the pawl out of contact with the ratchet segment during a portion of its path of movement and to permit the pawl to engage with the ratchet segment during the remainder of its path of movement, a movable stop the absence or presence of which in the path of movement of a portion of the feed control lever permits the pawl to move sooner or later into engagement with the ratchet segment, and a cam operative periodically to move said stop out of the path of movement of the feed control lever and thereafter to permit its return into said path of movement.

96. In a machine of the class described, the combination of a feed roll, a ratchet segment operatively connected thereto, a pawl oscillating through a fixed path, a feed control lever arranged to hold the pawl out of contact with the ratchet segment during a portion of its path of movement and to permit the pawl to engage with the ratchet segment during the remainder of its path of movement, a movable stop the absence or presence of which in the path of movement of a portion of the feed control lever permits the pawl to move sooner or later into engagement with the ratchet segment, and a cam member carried by the ratchet segment and arranged periodically to move said stop out of the path of movement of the feed control lever and thereafter to permit its return into said path of movement.

97. In a machine of the class described, the combination of a feed roll, a ratchet segment operatively connected thereto, an oscillating pawl arranged to give step by step movement to the ratchet segment, and automatically operating means arranged to cause the pawl periodically to give a greater than normal movement to the ratchet segment.

98. In a machine of the class described, the combination of a feed roll, a ratchet segment operatively connected thereto and having a cam portion, an oscillating pawl arranged to give step by step movement to the ratchet segment, and means co-operating with the cam portion of the ratchet segment arranged to cause the pawl periodically to give a greater than normal movement to the ratchet segment.

99. In a machine of the class described, the combination of a feed roll arranged for step by step movement, a feed control lever therefor arranged to control the lengths of the different steps of the movement of the feed roll, a stop normally positioned in the path of movement of a portion of the feed control lever, and means for periodically withdrawing said stop to permit a greater than normal movement of the feed control lever and accordingly to cause the feed roll to move a longer than normal step.

100. In a machine of the class described, the combination of a feed roll, a ratchet segment operatively connected thereto and arranged by its movement in one direction to give a corresponding movement to the feed roll, means tending to give the ratchet segment a retrograde movement, an oscillating pawl arranged periodically to move the ratchet segment against the operation of said means and accordingly to operate the feed roll, a second pawl arranged when in engagement with the ratchet segment to prevent its retrograde movement, and means for periodically withdrawing said second pawl from engagement with the ratchet segment to permit its retrograde movement.

101. In a machine of the class described, the combination of a feed roll, a ratchet segment operatively connected thereto, a feed control lever arranged to control the oscillation of the ratchet segment and accordingly to control the feeding movement of the feed roll, a pawl carried by the feed control lever and arranged when in engagement with the ratchet segment to prevent retrograde movement of the ratchet segment relative to the feed control lever, and a stop arranged to move said pawl out of engagement with the ratchet segment periodically during the oscillation of the feed control lever.

102. In a machine of the class described, a feed roll, a ratchet segment operatively connected thereto, a feed control lever arranged to control the movement of the ratchet segment and accordingly to control movement of the feed roll, means arranged to give step by step movement to the ratchet segment under the control of the feed control lever, a member carried by the feed control lever and arranged normally to prevent retrograde movement of the ratchet segment relative to the feed control lever, and means arranged periodically to cause said member to permit retrograde movement of the ratchet segment.

103. In a machine of the class described, the combination of a feed roll, a ratchet segment operatively connected thereto, a feed control lever arranged to control the movement of the ratchet segment and accordingly to control movement of the feed roll, an oscillating pawl arranged to give step by step movement to the ratchet segment under the control of the feed control lever, a pawl carried by the feed control lever and arranged by its engagement with the ratchet segment to prevent retrograde movement thereof relative to the feed control lever, and a stop arranged in the path of movement of a portion of said last named pawl and arranged periodically to withdraw that pawl from engagement with the ratchet segment to permit retrograde movement thereof.

104. In a machine of the class described, the combination of a feed roll, a ratchet segment operatively connected thereto, a feed control lever arranged by the extent of its oscillation to control the movement of the ratchet segment, and accordingly to control the feeding movement of the roll, an oscillating pawl arranged to give step by step movement to said ratchet segment under the control of the feed control lever, a second pawl carried by the feed control lever and arranged by its engagement with the ratchet segment to prevent retrograde movement thereof with respect to the feed control lever, a movable stop normally positioned in the path of movement of a portion of the feed control lever to limit the movement thereof, means for periodically withdrawing said stop, and a second stop beyond the normal path of movement of a portion of said feed control lever and arranged for engagement therewith when said movable stop is withdrawn so as at that time to withdraw said second pawl from engagement with the ratchet to permit retrograde movement thereof with respect to the feed control lever.

105. In a machine for inserting fastenings, a strip feeding device having, in combination, a feed roll, an oscillatable feed control lever therefor arranged by the extent of its oscillation to control the arc of movement of the feed roll, a stop removably held in the path of movement of a part of said feed control lever to limit the movement thereof and accordingly to control the arc of movement of the feed roll, a controller to start and stop the operation of the machine, and mechanism controlled by said controller to remove said stop from the path of movement of the feed control lever when said controller is operated to stop the machine so as to cause the last feeding movement of the feed roll to be of maximum extent.

106. In a machine for inserting fastenings, a strip feeding device having, in combination, a feed roll, an oscillatable feed control lever therefor arranged by the extent of its oscillation to control the arc of movement of the feed roll, a stop removably held in the path of movement of a part of said feed control lever to limit the movement thereof and accordingly to control the extent of movement of the feed roll, and means to remove said stop from the path of movement of the feed control lever at the commencement of the last cycle of operation when the machine is stopped to cause the last feeding movement of the feed roll to be of maximum extent.

107. In a machine for inserting fastenings, a strip feeding device having, in combination, a feed roll, an oscillatable feed control lever therefor arranged by the extent of its oscillation to control the extent of movement of the feed roll, a stop removably held in the path of movement of a part of said feed control lever to limit the movement thereof and accordingly to control the arc of movement of the feed roll, means to remove said stop from the path of movement of the feed control lever at the commencement of the last cycle of operation of the machine when the machine is stopped to cause the last feeding movement of the feed roll to be of maximum extent, and means to cause the return of said stop to the path of movement of the feed control lever after the commencement of the first cycle of operation when the machine is again started.

108. In a machine for inserting fastenings, a strip feeding device having, in combination, a feed roll, an oscillatable feed control lever therefor arranged by the extent of its movement to control the extent of movement of the feed roll, a movable stop held in the path of movement of a portion of the feed control lever, a ratchet segment movable adjacent to the feed control lever and arranged by its rotation through a predetermined arc to move said stop from the path of movement of said feed control lever, means operative to cause oscillating movement of the feed control lever and step by step movement of the ratchet segment to cause uniform step by step movement of the feed roll until said segment removes said stop from the path of movement of the feed control lever, and means, when the stop is so removed, to cause oscillation of the feed control lever of greater amplitude and accordingly to cause greater movement of the feed roll.

109. An awl feed machine for inserting fastenings having, in combination, a frame member, a driver carrier and a driver mounted for reciprocation therein, an awl bar carrier pivoted to said frame member for oscillating movement relatively to the driver carrier, an awl bar carried by said awl bar carrier, an awl carried by said awl bar, a slotted arm, means for oscillating said arm, and a link pivoted at one end to the awl bar carrier and adjustable at its other end along the slot of said arm to vary the extent of the feeding movement of the awl.

110. A shoe machine having, in combination, cyclically operated fastening inserting instrumentalities, a controller arranged to start and stop the operation of the machine, and mechanism constructed and arranged to cause the machine to operate through a complete cycle of operation after the manipulation of the controller to stop the machine in addition to the cycle in which the controller was manipulated.

111. A shoe machine having, in combination, cyclically operated fastening inserting instrumentalities including an awl arranged to make fastening receiving holes in the work, a controlling member arranged to start and stop the operation of the machine, and mechanism constructed and arranged to cause the machine to complete the insertion of the fastening in which it is engaged when the controlling member is operated to stop the machine and to cause the machine thereafter to make an awl hole in the work and to insert a fastening in said hole before ceasing to operate.

112. A shoe machine having, in combination, cyclically operated fastening inserting instrumentalities arranged in each cycle of operation to make a hole in the work and to insert a fastening in that hole, a treadle operatively connected to the machine and arranged by its displacements to start the machine and by its return to normal position to stop the machine, and mechanism arranged to cause the machine to complete the insertion of the fastening in which it is engaged at the time of the release of the treadle and to operate through a single cycle of operation and to insert a single fastening thereafter and then to stop the machine.

113. A machine for inserting fastenings having, in combination, a work support, toggle mechanism connected thereto, a spring arranged when said toggle is straightened to hold the work support in fastening inserting position, a ratchet slide connected to one of the toggle elements, a pawl carried by a stationary part of the machine, and means for moving the pawl into engagement with the ratchet slide once during each cycle of operation of the machine to restrain the slide from movement under the influence of the spring when the toggle is broken.

114. A machine for inserting fastenings having, in combination, a work support, work feeding means, toggle mechanism connected to the work support and arranged when straightened to elevate the work support, a spring forming an abutment against which the toggle may be straightened to raise the work support, means for breaking the toggle in each cycle of operation of the machine to relieve the pressure on the work while the work is fed, a ratchet slide connected to one of the toggle members, and a pawl carried by a stationary part of the machine and arranged for movement into engagement with the ratchet of the slide to restrain the toggle from movement under the influence of the spring when the toggle is broken to relieve the pressure on the work and movable out of engagement with the ratchet to cause the spring to form a yielding abutment when the toggle is straightened to take up the blow struck when a fastening is inserted.

115. A machine of the class described having, in combination, a standard having an opening in one of the walls thereof, a work support carried by said standard, and mechanism for raising and lowering the work support including a movable ratchet slide and a pawl both housed within the standard, said pawl being fulcrumed on a pin passing through the walls of the standard and accessible through said opening in the wall of the standard.

116. A machine of the class described, having, in combination, a standard having an opening in a wall thereof, a work support carried by said standard, toggle mechanism for raising and lowering the work support including a spring abutment and a movable ratchet slide housed within the standard, a pawl fulcrumed on the standard accessible through an opening in the wall of the standard arranged to co-operate with the ratchet slide to restrain the toggle from movement under the influence of the spring when the toggle is broken and to permit the spring to act as an abutment for the toggle when the toggle is straightened.

117. A machine of the class described, having, in combination, a standard having an opening in one of the walls thereof, a work support carried by the standard, toggle mechanism for raising and lowering said work support including a movable ratchet slide, a spring abutment therefor, a bracket carried by said standard and having an opening therein between the opening in the wall of the standard and the ratchet slide, and means for moving the pawl into and out of engagement with the ratchet slide to restrain the toggle from movement under the influence of the spring when the toggle is broken to lower the work support and to permit the spring to act as an abutment for the toggle when the toggle is straightened to raise the work support.

118. A machine of the class described having, in combination, a work support, a movable slide, connections from the slide to the work support arranged to elevate the work support upon movement of the slide, a treadle, power-operated means controlled by the treadle and arranged upon the depression of the treadle to move the slide, a latch arranged to retain the slide in the position to which it is moved to raise the work support, a second latch operative to hold the first latch in operative relation to the slide, and means operative at a predetermined point in each cycle of operation of the machine to release said second named latch for a brief interval to permit the release of the first latch and the lowering of the work support.

119. In a machine of the class described, a lever, a latch carried thereby, means engaging an arm of the lever to rock the lever and thereby to control the latch, an abutment to engage an arm of the lever to limit the movement thereof, and a latch engaging an arm of the lever to restrain the lever from movement in a direction to permit the release of the first named latch and operable at a predetermined point in each cycle of operation of the machine to release the lever and permit movement thereof and the release of the first named latch.

120. A machine of the class described having, in combination, a work support, a reciprocating slide, a normally stationary slide provided with a rack, a latch for connecting said slides to cause the reciprocating slide to move the normally stationary slide, a lever provided with a gear segment engaging the rack of the normally stationary slide and connected to the work support to raise the work support when the normally stationary slide is moved by the reciprocating slide.

121. A machine for inserting fastenings having, in combination, fastening inserting mechanism, a controller arranged to start and stop the operation of the machine, and mechanism constructed and arranged to cause the machine to operate through a complete cycle of operation in addition to that in which the controller was manipulated to stop the machine thereby causing an additional fastening to be inserted after the one inserted in the cycle during which the controller was moved to stop the machine.

122. A machine for inserting fastenings having, in combination, fastening inserting mechanism including an awl and a driver operated alternately to insert a fastening in each cycle of operation of the machine, a controlling member arranged to start and stop the operation of the machine, and mechanism constructed and arranged to cause the machine to complete the cycle of operation in which it is engaged when the controlling member is operated to stop the machine and to cause the machine to complete a single cycle of operation thereafter before ceasing to operate.

123. A machine for inserting fastenings having, in combination, fastening inserting mechanism including an awl and a driver operated alternately to insert a fastening in each cycle of operation of the machine, a treadle operatively connected to the machine and arranged by its displacement to start the machine and by its return to normal position to stop the machine, and mechansim arranged to cause the machine to complete the cycle of operation in which it is engaged at the time of the release of the treadle and to operate through a single additional cycle of operation thereafter and then to stop the machine.

124. In a machine of the class described, a work support, a clutch for controlling the operation of the machine, a power driven eccentric for raising the work support and throwing in the clutch, a treadle releasable by the operative at any time during the operation of the machine, and connections from the treadle to the clutch and work support for causing the throwing out of the clutch and the lowering of the work support at a predetermined point in the cycle of operation of the machine next after that during which the treadle is released.

125. In a machine of the class described, a work support, a clutch for controlling the operation of the machine, power-operated means operable at a predetermined point in the cycle of operation of the machine for raising the work support and throwing in the clutch or for throwing out the clutch and lowering the work support, and controlling means operable at any time during the operation of the machine for causing operation of the power operated means to throw out the clutch and lower the work support at such predetermined point in the next cycle of operation of the machine after that in which said controlling means is operated.

126. In a machine of the class described, a clutch, a work support, a treadle, a latch, arranged to hold the treadle in position to cause continued operation of the machine, means for releasing the latch for an instant during each cycle of operation of the machine, and connections from the treadle to the clutch and to the work support arranged to throw out the clutch at a predetermined point in the next cycle of operation of the machine after that in which the treadle is released to stop the machine, and thereafter to lower the work support.

127. A machine for inserting fastenings having, in combination, fastening inserting mechanism, a clutch for controlling the operation thereof, a treadle arranged by its movement to control the operation of the clutch, a latch arranged to hold the treadle in position to cause operation of the machine, and mechanism arranged to cause said latch to become inoperative for an instant at a predetermined point in each cycle of operation of the machine to permit the treadle to move to stopping position only at said point in the cycle of operation of the machine.

128. A machine for inserting fastenings having, in combination, a work support, fastening inserting mechanism constructed and arranged to perform the complete operation of inserting a single fastening during each cycle of operation of the machine, a clutch, and a controller for the clutch arranged, when the controller is actuated to stop the machine, to cause the machine to complete the cycle of operation on which it is then engaged and a single cycle of operation thereafter and then to throw out the clutch and lower the work support.

129. A machine for inserting fastenings having, in combination, a work support, fastening inserting mechanism including an awl and a driver, a clutch, mechanism operated from said clutch constructed and arranged to cause alternate operation of the awl and driver to insert fastenings, a treadle, and connections from the treadle to the clutch and work support arranged, when the treadle is moved to stop the machine, to cause the machine to complete the cycle of operation on which it is then engaged and a single cycle of operation thereafter, and then to throw out the clutch and lower the work support.

130. In a machine of the class described, the combination of a pair of opposed cutters, means for presenting a fastening strip from which fastenings are to be severed to the cutters, and means for moving one of the cutters towards the other to an extent to cause them partially to sever a fastening from the strip and for thereafter moving the cutters simultaneously both in the same direction to complete the severing operation with a shearing action.

131. A machine of the class described having, in combination, a pair of opposed cutters, and means for moving one of the cutters towards the other to an extent to cause them partially to sever a fastening from a fastening strip passing between them, and thereafter for moving them simultaneously in the same direction to complete the severing of the fastening.

132. A machine of the class described having, in combination, a pair of opposed cutters, a movable guide for conducting a fastening strip to the cutters, means for moving one of the cutters toward the other to an extent to cause them partially to sever a fastening from the fastening strip, and for thereafter moving them simultaneously in the same direction to complete the severing of the fastening, and means for thereafter moving the guide to its normal position.

133. A machine of the class described having, in combination, a pair of opposed cutters, a fastening receiving member adjacent to the cutters, and means for moving one of the cutters towards the other to an extent to cause them partially to sever a fastening from a fastening strip passing into the fastening receiving member, and thereafter for moving them simultaneously in the same direction while the fastening receiving member remains stationary to complete the severing of the fastening.

134. A machine of the class described having, in combination, a pair of opposed cutters, a fastening receiving member adjacent to the cutters, a movable guide for conducting a fastening strip between the cutters to the fastening receiving member, means for moving one of the cutters toward the other to an extent to cause them partially to sever a fastening from the fastening strip, and for thereafter moving them simultaneously in the same direction while the fastening receiving member remains stationary to complete the severing of the fastening, and means for thereafter moving the guide into alinement with the fastening receiving member.

135. A machine for inserting metallic fastenings having, in combination, a pair of opposed cutters, a throat member adjacent to the cutters, means for moving the cutters toward each other to an extent to cause them partially to sever a fastening strip passing through the throat and thereafter for moving them simultaneously in the same direction while the throat remains stationary to complete the severing of the strip, means for subsequently moving the throat from severing to fastening inserting position, and a driver co-operating with the throat to insert the fastenings in the article operated upon.

136. A machine for inserting fastenings having, in combination, a pair of opposed cutters, a throat member adjacent to the cutters, means for moving the cutters toward each other to an extent to cause them partially to sever a fastening strip passing through the throat and thereafter for moving them simultaneously in the same direction while the throat remains stationary to complete the severing of the strip, and means for subsequently moving the throat to present the severed fastening in inserting position.

137. A machine for inserting fastenings cut from wire having, in combination, a throat provided with a passage to receive the end of the wire, means for guiding the wire to said passage, a pair of cutters mounted adjacent to said throat, mechanism for relatively moving said cutters to carry their cutting edges toward each other partially to sever the wire and for thereafter causing said cutters to move in the same direction while the throat remains stationary to complete the severing of the wire, and means for subsequently moving the throat from the severing to fastening inserting position.

138. A machine of the class described having, in combination, a pair of opposed cutters, a throat member adjacent to the cutters, and means for moving one of the cutters toward the other to an extent to cause them partially to sever a fastening strip passing into the throat and thereafter for moving them simultaneously both in the same direction while the throat remains stationary to complete the severing of the strip.

139. In a machine for making fastenings from wire the combination with a throat having a passage to receive the end of a wire, means for guiding a wire to said passage, and a pair of cutters mounted adjacent to said throat and formed with cutting edges, of mechanism for relatively moving said cutters to carry said cutting edges toward each other partially to sever the wire, and for thereafter causing said cutters to move in the same direction while the throat remains stationary to complete the severing of the wire.

140. In a machine for making fastenings from wire the combination with a throat having a passage to receive the end of a wire, a floating member for guiding the wire into said passage, and a pair of cutters mounted adjacent to said throat, of mechanism for relatively moving said cutters toward each other partially to sever the wire and for causing said cutters thereafter to move in the same direction while the throat remains stationary to complete the severing of the wire, and means for positioning the floating member in alinement with the throat between cutting operations.

141. A machine for forming fastenings from wire having, in combination, a throat, a pair of cutters adjacent to the throat, means for relatively moving the cutters toward each other partially to sever a piece of wire and thereafter to move the cutters both in the same direction while the throat remains stationary to complete the severing of the wire, a floating member having an aperture through which the wire passes for guiding the wire to the throat constructed and arranged to permit the portion of the wire remote from the throat to move relatively to the throat during the cutting operation, and means to return said portion of the wire into alinement with the throat between cutting operations.

142. A machine for forming fastenings from wire having, in combination, a throat, a pair of cutter holders, a pair of cutters carried in opposed relation, one by each cutter holder, means relatively to move the cutter holders toward each other to cause the cutters partially to sever a fastening from a wire and thereafter to move the cutters both in the same direction while the throat remains stationary to complete the severing of the fastener from the wire, a movable guide member adjacent to the cutters, and provided with an aperture through which the wire passes, and a finger carried by one of the cutter holders and constructed and arranged to move said guide member to bring its aperture into alinement with the hole in the throat after the conclusion of the severing of each fastening from the wire.

143. A machine for forming fastenings from wire having, in combination, a throat, a pair of opposed cutters, a floating guide adjacent to the cutters and having an aperture to guide the wire to the throat, means to cause relative movement of the cutters toward each other partially to sever fastenings from the strip and thereafter to cause movement of the cutters in the same direction while the throat remains stationary to complete the severing of the fastenings from the strip, and a finger movable with one of the cutters to return the floating guide member into alinement with the opening in the throat after the conclusion of the cutting operation.

144. A machine for forming fastenings from wire having, in combination, a pair of cutters between which a piece of wire may be gripped, a floating member arranged to guide the wire to said cutters, means for moving the cutters to sever a fastening from the wire constructed and arranged to cause the two cutters to move simultaneously in the same direction toward the conclusion of the severing movement and thereafter to move to inoperative position, and means to return the floating member into position to aline the wire with the opening between the cutters when the cutters return to inoperative position.

In testimony whereof we have signed our names to this specification.

GEORGE GODDU.
FRED L. MACKENZIE.

CERTIFICATE OF CORRECTION.

Patent No. 1,686,808.  Granted October 9, 1928, to

GEORGE GODDU ET AL.

It is hereby certified that error appears in the printed specification of the above numbered patent requiring correction as follows: Page 2, line 4, for the word "on read "of"; page 13, line 14, claim 2, for the word "difficult" read "different"; and that the said Letters Patent should be read with these corrections therein that the same may conform to the record of the case in the Patent Office.

Signed and sealed this 4th day of June, A. D. 1929.

(Seal)

M. J. Moore,
Acting Commissioner of Patents.